(12) United States Patent
Hosomizu et al.

(10) Patent No.: US 10,804,006 B2
(45) Date of Patent: Oct. 13, 2020

(54) RESIN COMPOSITION MOLDED ARTICLE AND DIRECT-CURRENT POWER CABLE

(71) Applicant: SUMITOMO ELECTRIC INDUSTRIES, LTD., Osaka-shi, Osaka (JP)

(72) Inventors: Kohei Hosomizu, Osaka (JP); Yoitsu Sekiguchi, Osaka (JP); Takanori Yamazaki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/789,742

(22) Filed: Feb. 13, 2020

(65) Prior Publication Data

US 2020/0273598 A1    Aug. 27, 2020

(30) Foreign Application Priority Data

Feb. 25, 2019 (JP) .................................. 2019-031853

(51) Int. Cl.
| | |
|---|---|
| *H01B 9/00* | (2006.01) |
| *H01B 3/44* | (2006.01) |
| *C08K 3/013* | (2018.01) |
| *C08K 3/22* | (2006.01) |
| *C08K 3/04* | (2006.01) |
| *C08K 3/36* | (2006.01) |
| *C08K 9/06* | (2006.01) |
| *C08J 5/18* | (2006.01) |
| *B29C 48/00* | (2019.01) |
| *C08L 23/06* | (2006.01) |

(52) U.S. Cl.
CPC ........... *H01B 3/441* (2013.01); *B29C 48/022* (2019.02); *C08J 5/18* (2013.01); *C08K 3/013* (2018.01); *C08K 3/04* (2013.01); *C08K 3/22* (2013.01); *C08K 3/36* (2013.01); *C08K 9/06* (2013.01); *C08L 23/06* (2013.01); *H01B 9/00* (2013.01); *C08K 2003/222* (2013.01);

(Continued)

(58) Field of Classification Search
CPC . H01B 3/441; H01B 9/00; H01B 7/02; H01B 7/04; H01B 7/06; H01B 7/08
USPC .............. 174/110 R–110 PM, 120 R–121 SR
See application file for complete search history.

(56) References Cited

U.S. PATENT DOCUMENTS

| | | | |
|---|---|---|---|
| 4,690,959 A * | 9/1987 | Plueddemann | ........ C08K 5/092 428/447 |
| 6,716,920 B2 * | 4/2004 | Arhart | ....................... C08F 8/42 525/102 |

(Continued)

FOREIGN PATENT DOCUMENTS

| | | |
|---|---|---|
| JP | S57-043835 A | 3/1982 |
| JP | H06-256567 A | 9/1994 |

(Continued)

OTHER PUBLICATIONS

V.B.F. Mathot; "Temperature Dependence of Some Thermo-Dynamic Fucntions fo Amorphous and Semi-Crystalline Polymers;" Polymer Reviews; May 1984; pp. 579-599; vol. 25.

*Primary Examiner* — William H. Mayo, III
(74) *Attorney, Agent, or Firm* — Oliff PLC

(57) ABSTRACT

A resin composition molded article forming an insulation layer of a direct-current power cable, including: a cross-linked base resin containing polyethylene, and an inorganic filler having a mean volume diameter of 80 nm or less, wherein at least a part of a surface of the inorganic filler includes an aminosilyl group having an amino group, and a light transmittance at a wavelength of 500 nm of a sheet is 70% or more, as measured under an atmosphere at 90 ﾟ, when the sheet is fabricated by cutting the resin composition molded article into 0.5 mm thickness.

16 Claims, 3 Drawing Sheets

(52) U.S. Cl.
CPC ........... *C08K 2003/2227* (2013.01); *C08K 2003/2237* (2013.01); *C08K 2003/2244* (2013.01); *C08K 2003/2296* (2013.01); *C08K 2201/003* (2013.01); *C08L 2201/00* (2013.01); *C08L 2207/062* (2013.01); *C08L 2207/066* (2013.01)

(56) References Cited

U.S. PATENT DOCUMENTS

| | | | |
|---|---|---|---|
| 7,579,397 B2* | 8/2009 | Nelson | B82Y 30/00 174/110 AR |
| 7,884,149 B2* | 2/2011 | Nelson | B82Y 30/00 524/431 |
| 9,105,374 B2* | 8/2015 | Jungqvist | C08L 23/0869 |
| 9,127,110 B2* | 9/2015 | Sugita | C08F 255/02 |
| 2017/0330645 A1 | 11/2017 | Yamazaki et al. | |
| 2019/0047249 A1 | 2/2019 | Suzuki et al. | |

FOREIGN PATENT DOCUMENTS

| | | |
|---|---|---|
| JP | H07-122134 A | 5/1995 |
| JP | H11-016421 A | 1/1999 |
| JP | 2007-522282 A | 8/2007 |
| JP | 2013-82841 A | 5/2013 |
| JP | 2013-249388 A | 12/2013 |
| JP | 2014-019733 A | 2/2014 |
| WO | 2005/073983 A1 | 8/2005 |
| WO | 2017/149087 A1 | 9/2017 |
| WO | 2017/183447 A1 | 10/2017 |

\* cited by examiner

RESIN COMPOSITION MOLDED ARTICLE AND DIRECT-CURRENT POWER CABLE

BACKGROUND

Technical Field

The present disclosure relates to a resin composition molded article and a direct current power cable.

The present application claims priority based on Japanese Unexamined Patent Publication No. 2019-31853 filed on Feb. 25, 2019, which is incorporated herein by reference in its entirety.

Description of Related Art

In recent years, solid-insulated direct-current power cables (hereinafter abbreviated as 'DC power cables_) have been developed for DC power transmission applications. Upon electric charging of a DC power cable, space charges are generated in the insulation layer, which may cause a leakage current. Therefore, an inorganic filler may be sometimes added to the resin composition forming the insulation layer in order to suppress the leakage current during electric charging (for example, Patent Document 1).
Patent Document 1: Japanese Unexamined Patent Publication No. 1999-16421

SUMMARY OF THE INVENTION

According to an aspect of the present disclosure, there is provided a resin composition molded article forming an insulation layer of a direct-current power cable, including:

a cross-linked base resin containing polyethylene, and an inorganic filler having a mean volume diameter of 80 nm or less;

wherein at least a part of a surface of the inorganic filler includes an aminosilyl group having an amino group, and a light transmittance at a wavelength of 500 nm of a sheet is 70% or more, as measured under an atmosphere at 90 éC, when the sheet is fabricated by cutting the resin composition molded article into 0.5 mm thickness.

According to another aspect of the present disclosure, there is provided a resin composition molded article forming an insulation layer of a direct-current power cable, including:

a cross-linked base resin containing polyethylene, and an inorganic filler having a mean volume diameter of 80 nm or less;

wherein at least a part of a surface of the inorganic filler includes a hydrophobic silyl group represented by the following formula (1), and a light transmittance at a wavelength of 500 nm of a sheet is 70% or more, as measured under an atmosphere at 90 éC, when the sheet is fabricated by cutting the resin composition molded article into 0.5 mm thickness:
[Chem. 1]

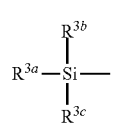

(1)

wherein $R^{3a}$, $R^{3b}$, and $R^{3c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{3a}$, $R^{3b}$, and $R^{3c}$ may be the same, or two or more of them may be different.

According to yet another aspect of the present disclosure, there is provided a direct-current power cable including:

a conductor, and an insulation layer provided on an outer periphery of the conductor;

wherein the insulation layer is composed of a resin composition molded article including a base resin containing polyethylene, and an inorganic filler having a mean volume diameter of 80 nm or less, the base resin being cross-linked;

at least a part of a surface of the inorganic filler includes an aminosilyl group having an amino group, and a light transmittance at a wavelength of 500 nm of a sheet is 70% or more, as measured under an atmosphere at 90 éC, when the sheet is fabricated by cutting the insulation layer into 0.5 mm thickness.

According to yet another aspect of the present disclosure, there is provided a direct-current power cable including:

a conductor, and an insulation layer provided on an outer periphery of the conductor;

wherein the insulation layer is composed of a resin composition molded article including a base resin containing polyethylene, and an inorganic filler having a mean volume diameter of 80 nm or less, the base resin being cross-linked;

at least a part of a surface of the inorganic filler includes a hydrophobic silyl group represented by the following formula (1), and a light transmittance at a wavelength of 500 nm of a sheet is 70% or more, as measured under an atmosphere at 90 éC, when the sheet is fabricated by cutting the insulation layer into 0.5 mm thickness:
[Chem. 2]

(1)

wherein $R^{3a}$, $R^{3b}$, and $R^{3c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{3a}$, $R^{3b}$, and $R^{3c}$ may be the same, or two or more of them may be different.

DESCRIPTION OF THE EMBODIMENTS

Figure 1:
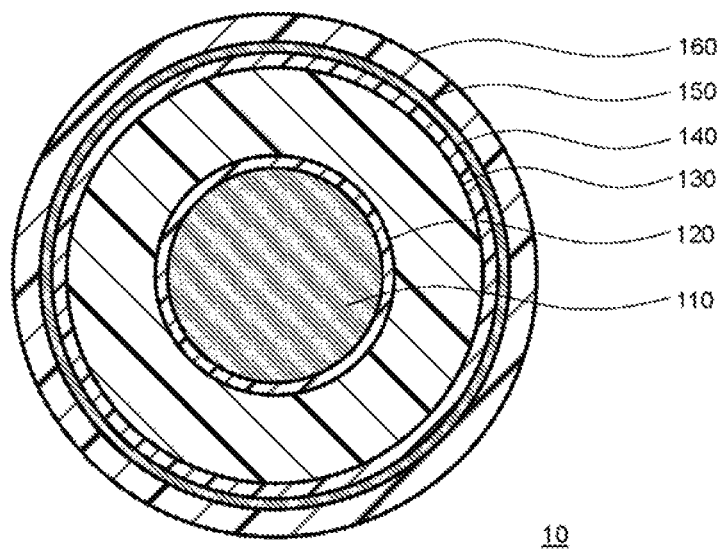
FIG. 1 is a schematic sectional view perpendicular to an axial direction of a DC power cable according to an embodiment of the present disclosure.

Problem to be Solved by the Disclosure

An object of the present disclosure is to provide a technique that can easily inspect a foreign material in an insulation layer.

Advantageous Effect of the Disclosure

According to the present disclosure, a foreign material in an insulation layer can be easily inspected.

Description of the Embodiment of the Disclosure

<Knowledges Obtained by the Inventors>

First, an outline of the knowledges obtained by the inventors will be described.

In a process of manufacturing a power cable, there is a risk that a foreign material such as a metal piece generated from a metallic sliding part of a kneader used in a granulation step of a resin composition, a metallic sliding part of an extruder used in an extrusion step or the like, may enter an insulation layer.

Therefore, an inspection step of inspecting the foreign material in the insulation layer may be performed as a so-called sampling inspection after the extrusion step or a cross-linking step of the insulation layer in some cases. In the inspection step, first, a part of the insulation layer in an axial direction of the DC power cable is cut into a predetermined thickness to prepare an inspection sheet. After the inspection sheet is prepared, the inspection sheet is observed using an optical microscope or the like to inspect a foreign material in the inspection sheet.

At this time, at least a part of a base resin is crystallized in the inspection sheet. When the base resin is crystallized, light is scattered by the crystal of the base resin, reducing the visible light transmittance of the inspection sheet. Therefore, in the inspection step, the inspection sheet is heated to a predetermined temperature to melt at least a part of the crystal of the base resin. As a result, the visible light transmissivity of the inspection sheet can be improved, and the foreign material in the inspection sheet can be inspected.

In this regard, the inventors have found that it is difficult to inspect a DC power cable in which the insulation layer includes an inorganic filler, even when the above-described inspection method is used.

In the inspection sheet cut out from the insulation layer of the DC power cable, light is scattered not only by the crystal of the base resin but also by the inorganic filler. In addition, the inorganic filler serves as a nucleating agent, and the crystal nuclei (of spherulite) in the base resin may increase. In this case, light is also scattered by the increased crystals of the base resin. For these reasons, the visible light transmissivity of the inspection sheet is likely to easily decrease due to the synergistic light scattering of the crystal of the base resin and the inorganic filler. In this case, the visible light transmissivity of the inspection sheet may not be sufficiently improved even when the inspection sheet is heated to a predetermined temperature during the inspection step. As a result, it may become difficult to inspect the foreign material in the inspection sheet of the DC power cable.

The present disclosure is based on the above-described knowledges found by the inventors.

Embodiments of the Disclosure

Next, embodiments of the present disclosure will be listed and described.

[1] A resin composition molded article according to an aspect of the present disclosure is a resin composition molded article forming an insulation layer of a direct-current power cable, including:

a cross-linked base resin containing polyethylene, and an inorganic filler having a mean volume diameter of 80 nm or less;

wherein at least a part of a surface of the inorganic filler includes an aminosilyl group having an amino group, and a light transmittance at a wavelength of 500 nm of a sheet is 70% or more, as measured under an atmosphere at 90 éC, when the sheet is fabricated by cutting the resin composition molded article into 0.5 mm thickness.

According to this configuration, a foreign material in the insulation layer can be easily inspected.

[2] In the resin composition molded article according to [1], the surface of the inorganic filler includes:

the aminosilyl group, and a hydrophobic silyl group having a hydrophobic group.

According to this configuration, the aminosilyl group can be suppressed from being exclusively and excessively bonded to the surface of the inorganic filler. As a result, the insulation property of the insulation layer can be significantly improved while improving the visible light transmissivity of the resin composition molded article.

[3] In the resin composition molded article according to [2], a molar fraction of the aminosilyl groups with respect to all of the silyl groups bonded to the surface of the inorganic filler is 2% or more and 90% or less.

According to this configuration, the effect of improving the insulation property of the insulation layer by giving the aminosilyl group to the inorganic filler can be stably obtained.

[4] In the resin composition molded article according to any one of [1] to [3], the content of the inorganic filler is 0.1 parts by mass or more and 10 parts by mass or less with respect to 100 parts by mass of the base resin.

According to this configuration, by setting the content of the inorganic filler to 0.1 parts by mass or more, a space charge can be sufficiently trapped by the inorganic filler. On the other hand, by setting the content of the inorganic filler to 10 parts by mass or less, the dispersibility of the inorganic filler in the insulation composition can be improved while improving the moldability of the resin composition.

[5] A resin composition molded article according to another aspect of the present disclosure is:

a resin composition molded article forming an insulation layer of a direct-current power cable, including:

a cross-linked base resin containing polyethylene, and an inorganic filler having a mean volume diameter of 80 nm or less;

wherein at least a part of a surface of the inorganic filler includes a hydrophobic silyl group represented by the following formula (1), and a light transmittance at a wavelength of 500 nm of a sheet is 70% or more, as measured under an atmosphere at 90 éC, when the sheet is fabricated by cutting the resin composition molded article into 0.5 mm thickness:

[Chem. 3]

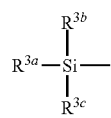

(1)

wherein $R^{3a}$, $R^{3b}$, and $R^{3c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{3a}$, $R^{3b}$, and $R^{3c}$ may be the same, or two or more of them may be different.

[6] In the resin composition molded article according to [5],
the content of the inorganic filler is 0.1 parts by mass or more and 5 parts by mass or less with respect to 100 parts by mass of the base resin.

According to this configuration, since the content of the inorganic filler is 0.1 parts by mass or more, a space charge can be sufficiently trapped by the inorganic filler. Since the content of the inorganic filler is 5 parts by mass or less, decrease in the insulation property of the insulation layer can be suppressed.

[7] In the resin composition molded article according to any one of [1] to [6],
the crystallinity of the base resin is 40% or less.

According to this configuration, the visible light transmissivity of the resin composition molded article can be improved.

[8] In the resin composition molded article according to any one of [1] to [7],
a volume resistivity of a sheet of the resin composition is 8 B 10^15 | Xcm or more, as measured under the condition at the temperature of 80 éC and the direct-current field of 50 kV/mm, when the sheet is fabricated by cutting the resin composition molded article into 0.2 mm thickness.

According to this configuration, a DC power cable with improved insulation property of the insulation layer can be obtained.

[9] A direct-current power cable according to yet another aspect of the present disclosure includes:
a conductor, and
an insulation layer provided on an outer periphery of the conductor;
wherein the insulation layer is composed of a resin composition molded article including a base resin containing polyethylene, and an inorganic filler having a mean volume diameter of 80 nm or less, the base resin being cross-linked;
at least a part of a surface of the inorganic filler includes an aminosilyl group having an amino group, and
a light transmittance at a wavelength of 500 nm of a sheet is 70% or more, as measured under an atmosphere at 90 éC, when the sheet is fabricated by cutting the insulation layer into 0.5 mm thickness.

According to this configuration, a foreign material in the insulation layer can be easily inspected.

[10] A direct-current power cable according to yet another aspect of the present disclosure includes:
a conductor, and
an insulation layer provided on an outer periphery of the conductor;
wherein the insulation layer is composed of a resin composition molded article including a base resin containing polyethylene, and an inorganic filler having a mean volume diameter of 80 nm or less, the base resin being cross-linked;
at least a part of a surface of the inorganic filler includes a hydrophobic silyl group represented by the following formula (1), and
a light transmittance at a wavelength of 500 nm of a sheet is 70% or more, as measured under an atmosphere at 90 éC, when the sheet is fabricated by cutting the insulation layer into 0.5 mm thickness:

[Chem. 4]

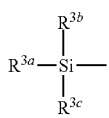

(1)

wherein $R^{3a}$, $R^{3b}$, and $R^{3c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{3a}$, $R^{3b}$, and $R^{3c}$ may be the same, or two or more of them may be different.

According to this configuration, a foreign material in the insulation layer can be easily inspected.

Details of Embodiment of the Disclosure

Next, an embodiment of the present disclosure will be described below with reference to the drawings. The present invention is not limited to these illustrations, but intended to be indicated by claims and encompass all the changes which fall within the meaning and scope equivalent to claims. The term '$C_p$ to $C_{n\_}$ used herein refers to contain from p to n carbon atoms.

One Embodiment of the Disclosure (1) Resin Composition (and Resin Composition Molded Article)

The resin composition of this embodiment is a material forming an insulation layer 130 of a DC power cable 10 described later, and includes, for example, a base resin, an inorganic filler, and other additives.

The term 'resin composition_ used herein encompasses a composition before the extrusion step in which compounding materials are mixed (kneaded), a composition covering the outer periphery of the conductor 110 after the extrusion step (before a cross-linking step) in which the base resin is non-cross-linked, and a composition after the cross-linking step in which the base resin is cross-linked. Among them, the composition covering the outer periphery of the conductor 110 after the extrusion step (before the cross-linking step) in which the base resin is non-cross-linked, and the composition after the cross-linking step in which the base resin is cross-linked, are also referred to as "resin composition molded articles".

(Base Resin)
A base resin (base polymer) means a resin component constituting the main component of the resin composition. The base resin of this embodiment contains, for example, polyethylene. Examples of the polyethylene constituting the base resin include, for example, low density polyethylene (LDPE), medium density polyethylene (MDPE), high density polyethylene (HDPE), and the like. In addition, the polyethylene may be either linear or branched, for example.

By cooling in a manner described below after the cross-linking step, the crystallization of the base resin is suppressed and the base resin is solidified in a state of containing a lot of amorphous portions, in a cross-linked resin composition.

Specifically, the crystallinity of the base resin is, for example, 45% or less, and more preferably 40% or less. 'Crystallinity_ used herein refers to a proportion of a crystalline portion in the entire base resin having the crystalline portion and an amorphous portion.

"Crystallinity" used herein is determined based on the result of differential scanning calorimetry (DSC). Specifically, for example, the following method is used.

The DSC device may be, for example, either a heat flux type or a power compensation type. The reference sample is, for example:—alumina. First, the reference sample and a predetermined resin composition are heated from 30 ꜱ to 150 ꜱ at a heating rate of 10 ꜱ/min, and a heat flow is plotted against temperature to obtain a DSC curve. In this case, an endothermic peak appears when the crystals of the base resin in the resin composition melt. After the DSC curve is obtained, the area of the region enclosed between the endothermic peak described above and the base line is determined to obtain a melting heat (in J/g) of the base resin. Based on the thus-obtained melting heat of the base resin and the melting heat of the perfect crystal, the crystallinity (in %) of the base resin is obtained by the following equation (2).

(Crystallinity of Base Resin)=(Actually Measured Melting Heat of Base Resin)/(Melting Heat of Perfect Crystal) $B$ 100 XXX  (2)

(wherein melting heat of the perfect crystal is a theoretical melting heat of polyethylene crystal having a crystallinity of 100%, and is 293 J/g according to V. B. F. Mathot, Polymer, 25, 579-599 (1984)).

When the crystallinity of the base resin obtained by the above method is more than 45%, light is scattered by the crystal of the base resin. For this reason, the visible light transmissivity of the insulation layer 130 is decreased. In contrast, by setting the crystallinity of the base resin to 45% or less, light scattering in the crystal of the base resin can be suppressed. Thereby, the visible light transmissivity of the insulation layer 130 can be improved. Furthermore, by setting the crystallinity of the base resin to 40% or less, the visible light transmissivity of the insulation layer 130 can be stably improved.

The lower limit of the crystallinity of the base resin is not particularly limited. However, from the viewpoint of obtaining predetermined mechanical characteristics, the crystallinity of the base resin is preferably 10% or more, for example.

(Inorganic Filler)

The inorganic filler is an inorganic powder added to the insulation layer 130, and acts to trap the space charge in the insulation layer 130 and to suppress the local accumulation of the space charge in the insulation layer 130. Thereby, the insulation property of the insulation layer 130 can be improved.

The inorganic filler includes, for example, at least any one of magnesium oxide, silicon dioxide, zinc oxide, aluminum oxide, titanium oxide, zirconium oxide, carbon black, and a mixture of two or more of them.

Examples of a method of forming magnesium oxide as the inorganic filler include a vapor phase method in which Mg vapor and oxygen are brought into contact with each other, or a seawater method in which magnesium oxide is formed from seawater as a raw material. The method of forming the inorganic filler in this embodiment may be either a vapor phase method or a seawater method.

Examples of silicon dioxide as the inorganic filler include at least any one of fumed silica, colloidal silica, precipitated silica, and vaporized metal combustion (VMC) silica. Among them, fumed silica is preferable as silicon dioxide.

In this embodiment, at least a part of the inorganic filler is surface-treated with a silane coupling agent. Thereby, the compatibility of the inorganic filler with the base resin can be improved and the adhesion at the interface between the inorganic filler and the base resin can be improved.

In this embodiment, at least a part of the inorganic filler is surface-treated with an aminosilane coupling agent including an amino group.

The aminosilane coupling agent is represented, for example, by the following formula (3).

$R^1_n SiX_{4-n} XXX$ (3)

(wherein $R^1$ represents a monovalent hydrocarbon group including at least any one of a primary amino group, a secondary amino group, a tertiary amino group, an acid-neutralized amino group (an amino group neutralized with an acid), and a quaternary ammonium base; X represents a monovalent hydrolyzable group; and n represents an integer from 1 to 3; provided that a plurality of $R^1$s may be the same or different when n is 2 or more).

Examples of the monovalent hydrolyzable group as X include, for example, a $C_1$ to $C_3$ alkoxy group and a halogen group.

Specifically, examples of the aminosilane coupling agent include, for example, at least any one of 3-aminopropyltrimethoxysilane, 3-aminopropyltriethoxysilane,
N-(2-aminoethyl)-3-aminopropylmethyldimethoxysilane,
N-(2-aminoethyl)-3-aminopropyltrimethoxysilane,
N-(2-aminoethyl)-3-aminopropyltri ethoxysilane,
3-triethoxysilyl-N-(1,3-dimethylbutylidene)propylamine,
N-phenyl-3-aminopropyltrimethoxysilane,
N-methyl-3-aminopropyltrimethoxysilane,
N-ethyl-3-aminopropyltrimethoxysilane,
N-butyl-3-aminopropyltrimethoxysilane,
N, N-dimethyl-3-aminopropyltrimethoxysilane,
N, N-diethyl-3-aminopropyltrimethoxysilane,
N, N-dibutyl-3-aminopropyltrimethoxysilane,
N-(vinylbenzyl)-3-aminopropyltrimethoxysilane hydrochloride,
octadecyldimethyl(3-trimethoxysilylpropyl)ammonium chloride,
tetradecyl dimethyl(3-trimethoxysilylpropyl)ammonium chloride,
N-trimethoxysilylpropyl-N, N, N-tri-n-butyl ammonium bromide,
N-trimethoxysilylpropyl-N, N, N-tri-n-butyl ammonium chloride,
N-trimethoxysilylpropyl-N, N, N-trimethyl ammonium chloride, and the like.

In a surface-treatment step of the inorganic filler, the hydrolyzable group of the silane coupling agent is hydrolyzed to produce a silanol group. The silanol group forms a hydrogen bond with a hydroxyl group on the surface of the inorganic filler, which further results in a dehydration condensation reaction. As a result, a predetermined silyl group is formed which is strongly covalently bonded to the surface of the inorganic filler.

In this embodiment, since the inorganic filler is surface-treated with the above-described aminosilane coupling agent, at least a part of the surface of the inorganic filler includes, for example, an aminosilyl group having an amino group derived from the aminosilane coupling agent (originating from the aminosilane coupling agent). In other words, the aminosilyl group is bonded to at least a part of the surface of the inorganic filler. Thereby, the visible light transmissivity and the insulation property of the insulation layer 130 can be stably improved.

Although the details of the mechanism by which the visible light transmissivity and the insulation property of the insulation layer 130 is improved when at least a part of the surface of the inorganic filler includes an aminosilyl group are not clearly known, the following mechanism is conceivable, for example. Since at least a part of the surface of the inorganic filler includes an aminosilyl group, the electrostatic repulsion between the amino groups on the surfaces of the inorganic fillers can be caused and the dispersibility of the inorganic filler in the resin composition can be improved when the inorganic fillers are adjacent to each other. As described above, it is considered that since the inorganic filer is surface-treated with the aminosilane coupling agent, the dispersibility in the resin composition can be improved, and consequently, the visible light transmissivity and the insulation property of the insulation layer 130 can be stably improved.

The aminosilyl group having the amino group derived from the aminosilane coupling agent is represented by the following formula (4), for example.
[Chem. 5]

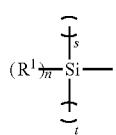

(4)

(wherein, as described above, $R^1$ represents a monovalent hydrocarbon group including at least any one of a primary amino group, a secondary amino group, a tertiary amino group, an acid-neutralized amino group, and a quaternary ammonium base; and n represents an integer from 1 to 3; provided that a plurality of $R^1$s may be the same or different when n is 2 or more; s and t for bonds represent 0 or 1, the sum of n, s, and t being 3).

In the aminosilyl group represented by formula (4), at least one bond other than the bond including $R^1$ is bonded to the inorganic filler with an oxygen atom interposed therebetween. All bonds other than the bond including $R^1$ may be bonded to the inorganic filler, or at least one bond other than the bond including $R^1$ may not be bonded to the inorganic filler. When at least one bond other than the bond including $R^1$ is not bonded to the inorganic filler, the bond not bonded to the inorganic filler may include a hydroxyl group or a hydrolyzable group, or may be bonded to another silyl group such as a hydrophobic silyl group described below.

In this embodiment, the carbon number of the hydrocarbon group $R^1$ having the amino group is preferably 3 or more and 12 or less, for example. The term 'carbon number_ used herein refers to the number of carbon atoms. By setting the carbon number of $R^1$ to 3 or more, the aminosilyl group can be bulky, which can cause steric hindrance on the surface of the inorganic filler. Thereby, the effect of the electrostatic repulsion between the amino groups can be efficiently caused. On the other hand, when the carbon number of $R^1$ is more than 12, the alkyl chain length becomes very long and the degree of freedom of movement of the methylene chain increases. For this reason, an excessive influence of the steric hindrance may be possibly exerted. As a result, the amount of modification with the aminosilane coupling agent or the like may be possibly decreased. For example, when the inorganic filler is surface-treated with both the aminosilane coupling agent and a hydrophobic silane coupling agent described below, it may possibly become difficult for a predetermined amount of the hydrophobic silyl group to be bonded to the surface of the inorganic filler. In contrast, by setting the carbon number of $R^1$ to 12 or less, the alkyl chain length can be suppressed from becoming excessively long and the degree of freedom of movement of the methylene chain can be suppressed from being excessively increased. Thereby, the excessive influence of a steric hindrance can be suppressed. As a result, the decrease in the amount of modification with the aminosilane coupling agent or the like can be suppressed. For example, when the inorganic filler is surface-treated with both the aminosilane coupling agent and the hydrophobic silane coupling agent described below, a predetermined amount of the hydrophobic silyl group can be bonded to the surface of the inorganic filler.

Furthermore, in this embodiment, the inorganic filler may be surface-treated not only with the aminosilane coupling agent described above but also with a hydrophobic silane coupling agent having a hydrophobic group.

Examples of the hydrophobic silane coupling agent include at least any one of silazane, alkoxysilane or halogenated silane, which includes a hydrophobic group.

Silazane (disilazane) having a hydrophobic group is represented by the following formula (5), for example.

$$R^2_3Si-NH-SiR^2_3 \quad (5)$$

(wherein $R^2$ represents at least any one of a $C_1$ to $C_{20}$ alkyl group optionally substituted with halogen, a $C_1$ to $C_{20}$ alkoxy group optionally substituted with halogen, a $C_2$ to $C_{20}$ alkenyl group optionally substituted with halogen, or a $C_6$ to $C_{12}$ aryl group optionally substituted with halogen or optionally substituted with a $C_1$ to $C_3$ alkyl group optionally substituted with halogen. The phrase 'optionally substituted with halogen_ means that a part of hydrogen atoms in the above-described hydrocarbon group may be substituted with halogen. In formula (5), $R^2$ is preferably a $C_1$ to $C_6$ alkyl group, a $C_2$ to $C_6$ alkenyl group, or a phenyl group. A plurality of $R^2$s may be the same or different).

Specifically, examples of silazane having a hydrophobic group include, for example, at least any one of hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, dimethyltetravinyldisilazane, and the like.

Alkoxysilane or halogenated silane having a hydrophobic group is represented by the following formula (6), for example.

$$R^2_mSiY_{4-m} \quad (6)$$

(wherein $R^2$ represents at least any one of a $C_1$ to $C_{20}$ alkyl group optionally substituted with halogen, a $C_1$ to $C_{20}$ alkoxy group optionally substituted with halogen, a $C_2$ to $C_{20}$ alkenyl group optionally substituted with halogen, or a $C_6$ to $C_{12}$ aryl group optionally substituted with halogen or optionally substituted with a $C_1$ to $C_3$ alkyl group optionally substituted with halogen. Y represents a monovalent hydrolyzable group, and m represents an integer from 1 to 3. When m is 2 or more, a plurality of $R^2$s may be the same or different).

The monovalent hydrolyzable group as Y is a $C_1$ to $C_3$ alkoxy group or a halogen group, for example.

Specifically, examples of the alkoxysilane having a hydrophobic group include, for example, at least any one of methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, iso-butyltrimethoxysilane, hexyltrimethoxysilane, octyltrimethoxysilane, decyltrimethoxysilane, dodecyltrimethoxysilane, methyltriethoxysilane, dimethyldiethoxysilane, phenyltriethoxysilane, diphenyldiethoxysilane, iso-butyltriethoxysilane, decyltriethoxysilane, vinyltriethoxysilane, chloropropyltrimethoxysilane, and the like.

In addition, examples of the halogenated silane having a hydrophobic group include, for example, at least any one of methyltrichlorosilane, dimethyldichlorosilane, trimethylchlorosilane, phenyltrichlorosilane, diphenyldichlorosilane, tert-butyldimethylchlorosilane, vinyltrichlorosilane, and the like.

The hydrophobic silane coupling agent used along with the aminosilane coupling agent is not limited to the silane coupling agent described above and may be a silane coupling agent other than the above-described silane coupling agents so long as it has a hydrophobic group.

In this embodiment, since the inorganic filler is surface-treated not only with the above-described aminosilane coupling agent but also with the hydrophobic silane coupling agent, the surface of the inorganic filler includes not only an aminosilyl group but also a hydrophobic silyl group having a hydrophobic group derived from the hydrophobic silane coupling agent (originating from the hydrophobic silane coupling agent). Since not only the aminosilyl group but also the hydrophobic silyl group is given to the surface of the inorganic filler, the aminosilyl group can be suppressed from being exclusively and excessively bonded to the surface of the inorganic filler. Thereby, the insulation property of the insulation layer 130 can be significantly improved, while the visible light transmissivity of the insulation layer 130 is improved.

The hydrophobic silyl group having the hydrophobic group derived from the hydrophobic silane coupling agent is represented by the following formula (7), for example.

[Chem. 6]

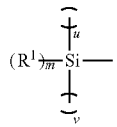

(7)

(wherein $R^2$ represents at least any one of a $C_1$ to $C_{20}$ alkyl group optionally substituted with halogen, a $C_1$ to $C_{20}$ alkoxy group optionally substituted with halogen, a $C_2$ to $C_{20}$ alkenyl group optionally substituted with halogen, or a $C_6$ to $C_{12}$ aryl group optionally substituted with halogen or optionally substituted with a $C_1$ to $C_3$ alkyl group optionally substituted with halogen. m represents an integer from 1 to 3. When m is 2 or more, a plurality of $R^2$s may be the same or different. u and v for bonds represent 0 or 1, the sum of m, u and v being 3).

In the hydrophobic silyl group represented by formula (7), at least one bond other than the bond including $R^2$ is bonded to the inorganic filler with an oxygen atom interposed therebetween. All bonds other than the bond including $R^2$ may be bonded to the inorganic filler, or at least one bond other than the bond including $R^2$ may not be bonded to the inorganic filler. When at least one bond other than the bond including $R^2$ is not bonded to the inorganic filler, the bond not bonded to the inorganic filler may include a hydroxyl group or a hydrolyzable group, or may be bonded to another silyl group such as the aminosilyl group described above.

In this embodiment, the carbon number of the hydrophobic group $R^2$ is preferably smaller than the carbon number of the hydrocarbon group $R^1$ having the amino group in the aminosilyl group described above, for example. By setting the carbon number of $R^2$ to be smaller than the carbon number of $R^1$, the aminosilyl group can be bulkier than the hydrophobic silyl group. Thereby, the effect of the electrostatic repulsion between the amino groups can be efficiently caused. Specifically, the hydrophobic group $R^2$ is preferably a methyl group or an ethyl group, for example.

In this embodiment, the molar fraction of the aminosilyl groups with respect to all of the silyl groups bonded to the surface of the inorganic filler (hereinafter also referred to as the 'molar fraction of the aminosilyl groups_) is, for example, 2% or more and 90% or less, and preferably 5% or more and 80% or less. The phrase, 'the molar fraction of the aminosilyl groups_, used herein, represents a rate, in %, of the mole number of the aminosilyl group with respect to the mole number of all of the silyl groups bonded to the surface of the inorganic filler.

When the molar fraction of the aminosilyl groups is less than 2%, the rate of change in the volume resistivity with respect to the molar fraction of the aminosilyl groups is high. Accordingly, the volume resistivity of the insulation layer 130 is likely to easily vary with respect to the manufacturing process-derived variation in the molar fraction of the aminosilyl groups. For this reason, an effect of improving the insulation property of the insulation layer 130 by giving the aminosilyl group to the inorganic filler may not be stably obtained. In contrast, in this embodiment, by setting the molar fraction of the aminosilyl groups to 2% or more, the effect of improving the insulation property of the insulation layer 130 can be stably obtained even when a predetermined manufacturing process-derived variation occurs in the molar fraction of the aminosilyl groups. Furthermore, in this embodiment, by setting the molar fraction of the aminosilyl groups to 5% or more, the effect of improving the insulation property of the insulation layer 130 can be significantly obtained.

On the other hand, when the molar fraction of the aminosilyl groups is more than 90%, hydrogen bonds are formed with amino groups interposed between particles, thereby the electrostatic repulsion between the amino groups may be less likely to be caused. Moreover, due to the interparticle hydrogen bonds, a conductive path through the particle interface may be readily formed. For this reason, the effect of improving the insulation property of the insulation layer 130 by giving an aminosilyl group to the inorganic filler may not be sufficiently obtained. In contrast, in this embodiment, by setting the molar fraction of the aminosilyl groups to 90% or less, formation of the hydrogen bonds with amino groups interposed between particles can be suppressed, and the electrostatic repulsion between amino groups can be sufficiently caused. Furthermore, formation of the conductive path through the particle interface due to the hydrogen bonds can be stably suppressed. Thereby, the effect of improving the insulation property of the insulation layer 130 can be sufficiently obtained. Furthermore, in this embodiment, by setting the molar fraction of the aminosilyl groups to 80% or less, the effect of improving the insulation property of the insulation layer 130 can be significantly obtained.

The molar fraction of the aminosilyl groups described above can be determined by the following method, for example.

Specifically, an inorganic filler is firstly prepared, which is surface-treated with the aminosilane coupling agent and the hydrophobic silane coupling agent at a predetermined ratio. Next, elemental analysis of the surface of the inorganic filler is performed by gas chromatography using a thermal conductivity detector (TCD) under the condition at the reaction temperature of 850 éC and the reduction temperature of 600 éC. As a result, the mass ratio of nitrogen to carbon (hereinafter, N/C ratio) in the silyl group actually bonded to the surface of the inorganic filler is obtained.

On the other hand, a calibration curve of the N/C ratio with respect to the molar fraction of the aminosilyl groups is obtained by the following procedure. The aminosilyl group is identified from the aminosilane coupling agent used for the surface-treatment, and the total atomic weight $C_1$ of carbon and the total atomic weight $N_1$ of nitrogen per aminosilyl group are determined. Further, the hydrophobic silyl group is identified from the hydrophobic silane coupling agent used for the surface-treatment, and the total atomic weight $C_2$ of carbon per hydrophobic silyl group is determined. Let x be the molar fraction of the aminosilyl groups (in %) and y be the N/C ratio (in %). The N/C ratio, y, is represented by the following equation (8) as a function of the molar fraction of the aminosilyl group, x, which constitutes the calibration curve. Note that $C_1$ and $C_2$ in the following equation (8) are not the carbon number, respectively.

$$y=N_1x/\{(C_1 Б C_2)x+100C_2\}XXX \quad (8)$$

(wherein 0<x Ħ 100).

In the equation (8), when the carbon number of the aminosilyl group is equal to the carbon number of the hydrophobic silyl group, that is, $C_1=C_2$, the N/C ratio, y, is a linear function of the molar fraction of the aminosilyl group, x, that is, the calibration curve is linear.

For example, when the aminosilyl group is an aminopropylsilyl group ($C_1$=36.03) and the hydrophobic silyl group is a trimethylsilyl group ($C_2$=36.03), the calibration curve is linear. When the molar fraction of the aminosilyl group, x, is 100%, the theoretical value of the N/C ratio, y, is about 38.9%.

After the calibration curve is obtained as described above, the actually measured N/C ratio, y, is substituted in equation (8), which is the calibration curve. Thereby, the molar fraction of the aminosilyl group, x, in the silyl groups which are actually bonded to the surface of the inorganic filler is determined.

In this embodiment, it is preferred that the N/C ratio obtained by elemental analysis of the surface of the inorganic filler by gas chromatography described above be, for example, 0.7% or more and 35% or less, and preferably 1.9% or more and 31% or less (in the case where the aminosilyl group is an aminopropylsilyl group). Thereby, the molar fraction of the aminosilyl groups can be 2% or more and 90% or less, and preferably 5% or more and 80% or less.

On the other hand, in this embodiment, the inorganic filler may be surface-treated with only the hydrophobic silane coupling agent having a hydrophobic group.

Examples of the hydrophobic silane coupling agent in this case include at least any one of silazane, alkoxysilane or halogenated silane, which includes a hydrophobic group.

In the case where the inorganic filler is surface-treated with only the hydrophobic silane coupling agent, silazane (disilazane) having a hydrophobic group is represented by the following formula (9), for example.

$$R^3_3Si-NH-SiR^3_3 \quad (9)$$

(wherein $R^3$ represents at least any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group. The phrase 'optionally substituted with an alkyl group_ means that a part of hydrogen atoms in the above-described aryl group may be substituted with the alkyl group. A plurality of $R^3$s may be the same, or two or more of them may be different).

Specifically, examples of silazane having a hydrophobic group include, for example, at least any one of hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, dimethyltetravinyldisilazane, and the like.

In the case where the inorganic filler is surface-treated with only the hydrophobic silane coupling agent, alkoxysilane or halogenated silane having a hydrophobic group is represented by the following formula (10), for example.

$$R^3_3SiYXXX \quad (10)$$

(wherein $R^3$ represents at least any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group. Y represents a monovalent hydrolyzable group. Three $R^3$s may be the same, or two or more of them may be different).

The monovalent hydrolyzable group as Y is a $C_1$ to $C_3$ alkoxy group or a halogen group, for example.

Specifically, examples of the alkoxysilane having a hydrophobic group include, for example, trimethyl methoxysilane, trimethyl ethoxysilane, and the like.

In addition, examples of the halogenated silane having a hydrophobic group include, for example, trimethylchlorosilane, triethylchlorosilane, and the like.

In this embodiment, since the inorganic filler is surface-treated with the above-described hydrophobic silane coupling agent, three hydrophobic groups are bonded to a silicon atom in the hydrophobic silyl group bonded to at least a part of the surface of the inorganic filler. In other words, neither a hydroxyl group nor a hydrolyzable group is bonded to the silicon atom of the hydrophobic silyl group.

Specifically, the hydrophobic silyl group is represented by the following formula (1), for example.

[Chem. 7]

(1)

(wherein $R^{3a}$, $R^{3b}$, and $R^{3c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{3a}$, $R^{3b}$, and $R^{3c}$ may be the same, or two or more of them may be different).

In the hydrophobic silyl group represented by formula (1), a bond other than the bond including $R^{3a}$, $R^{3b}$, or $R^{3c}$ is bonded to the inorganic filler with an oxygen atom interposed therebetween.

Since at least a part of the surface of the inorganic filler includes the hydrophobic silyl group represented by formula (1), the hydrophobicity on the surface of the inorganic filler can be improved. By improving the hydrophobicity on the surface of the inorganic filler, the compatibility of the inorganic filler with the base resin can be improved. Thereby, the dispersibility of the inorganic filler in the resin composition can be improved. As a result, the visible light transmissivity and the insulation property of the insulation layer 130 can be stably improved.

In this embodiment, each of $R^{3a}$, $R^{3b}$, and $R^{3c}$ in formula (1) is preferably, for example, a $C_1$ to $C_6$ alkyl, a $C_2$ to $C_6$ alkenyl group, or a phenyl group. Thereby, the excessive influence of a steric hindrance by $R^{3a}$, $R^{3b}$, and $R^{3c}$ can be the suppressed. As a result, the decrease in the amount of modification with the hydrophobic silane coupling agent or the like can be suppressed.

In this embodiment, the mean volume diameter (MV) of the inorganic filler is not particularly limited, but is, for example, 80 nm or less, preferably 50 nm or less, and more preferably 30 nm or less.

The term, 'mean volume diameter (MV)_ used herein is determined by the following equation:

$$MV = \sum V_i d_i / \sum V_i$$

wherein $d_i$ is a particle diameter of a particle and $V_i$ is a particle volume.

For a measurement of the mean volume diameter, a dynamic light scattering-type particle diameter/particle size distribution measuring device may be used.

By setting the mean volume diameter of the inorganic filler to 80 nm or less, the visible light transmissivity of the insulation layer 130 can be stably improved. In addition, an effect of suppressing the local accumulation of the space charge in the insulation layer 130 can be stably obtained. Furthermore, by setting the mean volume diameter of the inorganic filler to 50 nm or less, preferably 30 nm or less, the visible light transmissivity of the insulation layer 130 can be more stably improved. In addition, an effect of suppressing the local accumulation of the space charge in the insulation layer 130 can be more stably obtained.

The lower limit of the mean volume diameter of the inorganic filler is also not particularly limited. However, from the viewpoint of stably forming the inorganic filler, the mean volume diameter of the inorganic filler is, for example, 1 nm or more, and preferably 5 nm or more.

In this embodiment, the content of the inorganic filler in the resin composition is not particularly limited. However, in the case where the surface of the inorganic filler includes only the hydrophobic silyl group represented by formula (1), the content of the inorganic filler in the resin composition is preferably 0.1 parts by mass or more and 5 parts by mass or less with respect to 100 parts by mass of the base resin, for example. When the content of the inorganic filler is less than 0.1 parts by mass, the space charge may be insufficiently trapped by the inorganic filler. In contrast, by setting the content of the inorganic filler to 0.1 parts by mass or more, the space charge can be sufficiently trapped by the inorganic filler. On the other hand, in the case where the surface of the inorganic filler includes only the hydrophobic silyl group, when the content of the inorganic filler is more than 5 parts by mass, the insulation property of the insulation layer 130 may possibly decrease gradually. In contrast, by setting the content of the inorganic filler to 5 parts by mass or less, the decrease in the insulation property of the insulation layer 130 can be suppressed.

On the other hand, in the case where the surface of the inorganic filler includes at least the aminosilyl group, the insulation property of the insulation layer 130 can be kept high even when the content of the inorganic filler in the resin composition is more than 5 parts by mass. This is considered because even when the content of the inorganic filler is increased, the interparticle electrostatic repulsion by the amino groups is large, so that the dispersibility of the inorganic filler in the resin composition can be maintained well.

Therefore, in the case where the surface of the inorganic filler includes at least the aminosilyl group, the content of the inorganic filler in the resin composition can be, for example, 0.1 parts by mass or more and 10 parts by mass or less with respect to 100 parts by mass of the base resin. In the case where the surface of the inorganic filler includes at least the aminosilyl group, the effect of the content of the inorganic filler being 0.1 parts by mass or more is similar to the effect obtained in the case where the surface of the inorganic filler includes only the hydrophobic silyl group. On the other hand, in the case where the surface of the inorganic filler includes at least the aminosilyl group, by setting the content of the inorganic filler to 10 parts by mass or less, the dispersibility of the inorganic filler in the insulation layer 130 can be improved while improving the moldability of the resin composition.

(Cross-Linking Agent)

In this embodiment, the base resin constituting the resin composition may be non-cross-linked or cross-linked when the insulation layer 130 is formed. In either case, the effect of improving the visible light transmissivity of the insulation layer 130 can be obtained by applying the manufacturing method described later.

In this embodiment, the base resin is preferably cross-linked, for example. Thereby, a predetermined mechanical property, and shape-stability at a high temperature can be improved.

When the resin composition is cross-linked, the resin composition preferably contains, for example, organic peroxide as the cross-linking agent. Examples of the organic peroxide include, for example, dicumylperoxide, t-butyldicumylperoxide, di(t-butylperoxide), 2,5-dimethyl-2,5-di(t-butylperoxy) hexane, 1,3-bis(t-butylperoxyisopropyl)benzene, butyl 4,4-bis[(t-butyl)peroxy]pentanoate, 1,1-bis(1,1-dimethylethylperoxy)cyclohexane, and the like. Two or more of them may be used in combination.

(Other Additives)

The resin composition may further include, for example, an antioxidant and a lubricant.

Examples of the anti oxidant include, for example, 2,2-thio-diethylene bis[3-(3,5-di-t-butyl-4-hydroxyphenyl)propionate], pentaerythrityl-tetrakis[3-(3,5-di-t-butyl-4-hydroxyphenyl)propionate], octadecyl 3-(3,5-di-t-butyl-4-hydroxyphenyl)propionate, 2,4-bis-[(octylthio)methyl]-o-cresol, 2,4-bis(n-octylthio)-6-(4-hydroxy-3,5-di-t-butylanilino)-1,3,5-triazine, bis[2-methyl-4-{3-n-alkyl($C_{12}$ or $C_{14}$)thiopropionyloxy}-5-t-butyl phenyl]sulfide, and 4,4'-thiobis(3-methyl-6-t-butylphenol), and the like. Two or more of them may be used in combination.

The lubricant acts to suppress aggregation of the inorganic filler and also improve the fluidity of the resin composition during extrusion molding of the insulation layer 130. A known material can be used for the lubricant of this embodiment.

The resin composition may further include a colorant, for example.

(2) DC Power Cable

Next, with reference to FIG. 1, the DC power cable of this embodiment will be described. FIG. 1 is a cross-sectional view perpendicular to the axial direction of the DC power cable according to this embodiment.

The DC power cable 10 of this embodiment is configured as a so-called solid insulation DC power cable (cable for DC power transmission), and includes, for example, a conductor 110, an internal semiconductive layer 120, an insulation layer 130, an external semiconductive layer 140, a shielding layer 150, and a sheath 160.

(Conductor (Conductive Part))

The conductor 110 is configured by twisting together a plurality of conductor core wires (conductive core wires) including, for example, pure copper, copper alloy, aluminum, aluminum alloy, or the like.

(Internal Semiconductive Layer)

The internal semiconductive layer 120 is provided to cover the outer periphery of the conductor 110. In addition, the internal semiconductive layer 120 is configured to have semi conductivity and to suppress electric field concentration on the surface side of the conductor 110. The internal semiconductive layer 120 includes, for example, at least any one of ethylene-ethyl acrylate copolymer, ethylene-methyl acrylate copolymer, ethylene-butyl acrylate copolymer, and ethylene-vinyl acetate copolymer, together with conductive carbon black.

(Insulation Layer)

The insulation layer 130 is provided to cover the outer periphery of the internal semiconductive layer 120, and is composed of a resin composition molded article described above. As described above, the insulation layer 130 may be non-cross-linked, or may be cross-linked by heating the resin composition of this embodiment after extrusion molding. In this embodiment, for example, the resin composition molded article is cross-linked.

(External Semiconductive Layer)

The external semiconductive layer 140 is provided to cover the outer periphery of the insulation layer 130. In addition, the external semiconductive layer 140 is configured to have semiconductivity and to suppress electric field concentration between the insulation layer 130 and the shielding layer 150. The external semiconductive layer 140 contains, for example, the same material as that of the internal semiconductive layer 120.

(Shielding Layer)

The shielding layer 150 is provided to cover the outer periphery of the external semiconductive layer 140. The shielding layer 150 is, for example, configured by winding a copper tape, or configured as a wire shield formed by winding a plurality of soft copper wires. A tape including rubberized cloth or the like as a raw material may be wound inside or outside the shielding layer 150.

(Sheath)

The sheath 160 is provided to cover the outer periphery of the shielding layer 150. The sheath 160 contains, for example, polyvinyl chloride or polyethylene.

(Visible Light Transmissivity of Insulation Layer)

Regarding the DC power cable 10 configured as described above, in the resin composition molded article composing the insulation layer 130, as described above, the crystallinity of the base resin is low and the dispersibility of the inorganic filler is improved. Thereby, the insulation layer 130 has the visible light transmissivity described later under a predetermined condition.

In this embodiment, when a sheet is fabricated by cutting the insulation layer 130 into 0.5 mm thickness (when a sheet of the insulation layer 130 having a thickness of 0.5 mm is formed) (after the cooling step described later is performed), the light transmittance at a wavelength of 500 nm (hereinafter sometimes abbreviated as 'visible light transmittance_) of the sheet is, for example, 55% or more, and preferably 70% or more, as measured in an atmosphere at 90 ℃. When the visible light transmittance of the sheet of the insulation layer 130 is less than 55%, the sheet becomes cloudy, which makes it difficult to inspect a foreign material in the insulation layer 130. In contrast, by setting the visible light transmittance of the sheet of the insulation layer 130 to 55% or more, a foreign material in the insulation layer 130 can be easily inspected. Furthermore, by setting the visible light transmittance of the sheet of the insulation layer 130 to 70% or more, a foreign material in the insulation layer 130 can be easily and reliably inspected.

Since the higher upper limit of the visible light transmittance of the insulation layer 130 is favored, the upper limit is not limited. However, the visible light transmittance of the sheet of the insulation layer 130 of this embodiment is less likely to be lower than the visible light transmittance of the insulation layer free of the inorganic filler. For this reason, the visible light transmittance of the sheet of the insulation layer 130 of this embodiment is, for example, 95% or less.

(Insulation Property of Insulation Layer)

In the DC power cable 10 configured as described above, since at least a part of the surface of the inorganic filler added into the insulation layer 130 includes a predetermined silyl group, for example, the following insulation property can be obtained.

In this embodiment, when the insulation layer 130 is composed of the above described resin composition molded article and a sheet is fabricated by cutting the insulation layer 130 into 0.2 mm thickness, the volume resistivity of the sheet of the insulation layer 130 as measured under the condition at the temperature of 80 ℃ and the DC field of 50 kV/mm is higher than the volume resistivity of the resin composition having the same configuration other than the point that the inorganic filler is not surface-treated, as measured under the same condition, for example.

Moreover, in this embodiment, when the insulation layer 130 is composed of the above described resin composition molded article in which the base resin contains LDPE and a sheet is fabricated by cutting the insulation layer 130 into 0.2 mm thickness, the volume resistivity of the sheet of the insulation layer 130 is, for example, $8 \times 10^{15}$ Ω·m or more, preferably $5 \times 10^{16}$ Ω·m or more, and more preferably $1 \times 10^{17}$ Ω·m or more, as measured under the condition at the temperature of 80 ℃ and the DC field of 50 kV/mm.

Since the higher upper limit of the volume resistivity of the insulation layer 130 is favored, the upper limit is not particularly limited. However, the upper limit of the volume resistivity of the insulation layer 130 which is determined by optimization of the various conditions including the molar fraction of the aminosilyl group is, for example, a measurement upper limit, about $1 \times 10^{19}$ Ω·m.

(Specific Dimensions and the Like)

Specific dimensions of the DC power cable 10 are not particularly limited. For example, the diameter of the conductor 110 is 5 mm or more and 60 mm or less, the thickness of the internal semi conductive layer 120 is 1 mm or more and 3 mm or less, the thickness of the insulation layer 130 is mm or more and 35 mm or less, the thickness of the external semi conductive layer 140 is 1 mm or more and 3 mm or less, the thickness of the shielding layer 150 is 1 mm or more and 5 mm or less, and the thickness of the sheath 160 is 1 mm or more. The DC voltage applied to the DC power cable 10 of this embodiment is, for example, 20 kV or more.

(3) Method for Manufacturing DC Power Cable

Figure 2:
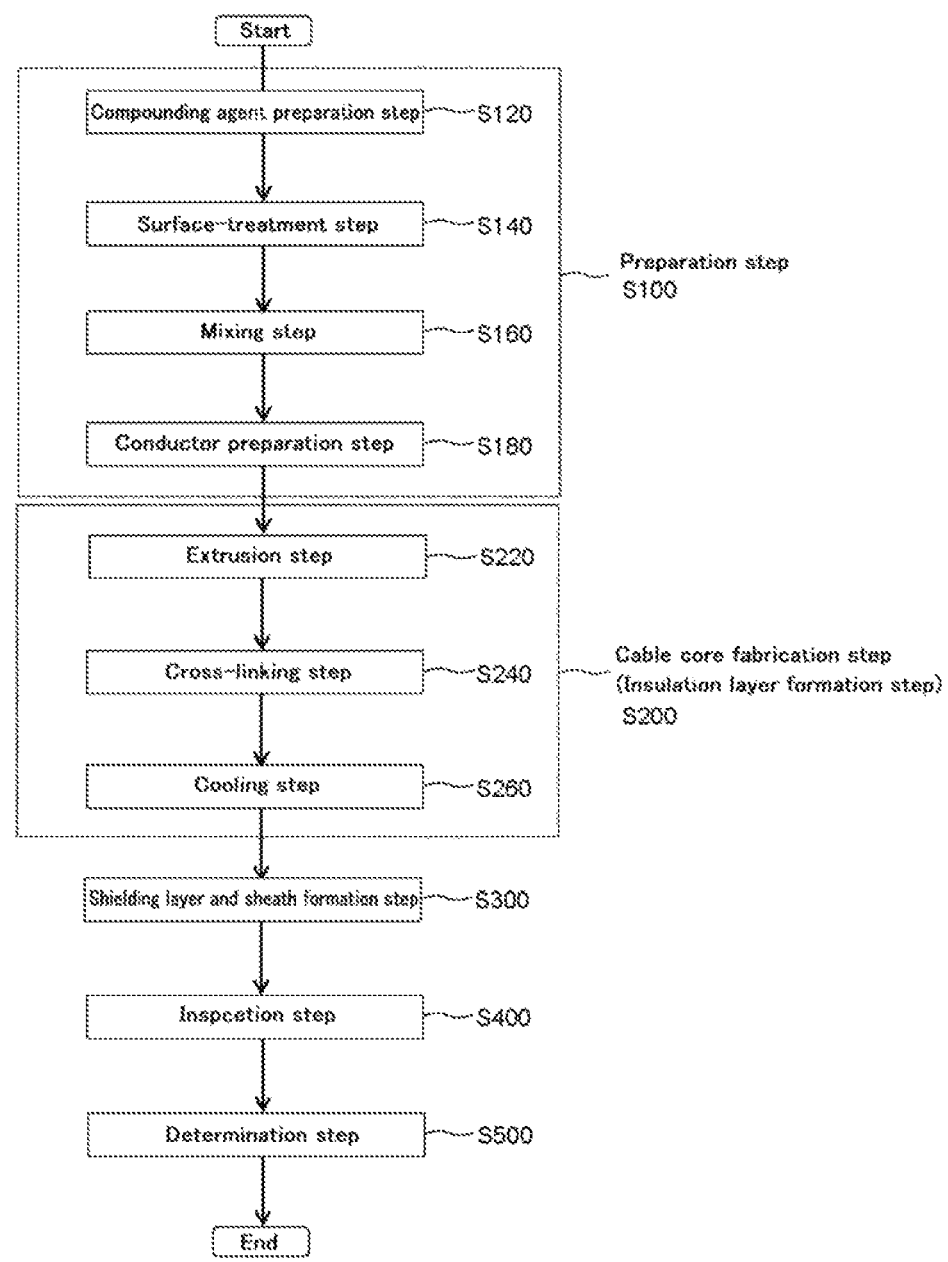
FIG. 2 is a flow chart illustrating a method of manufacturing the DC power cable according to an embodiment of the present disclosure.
Figure 3:
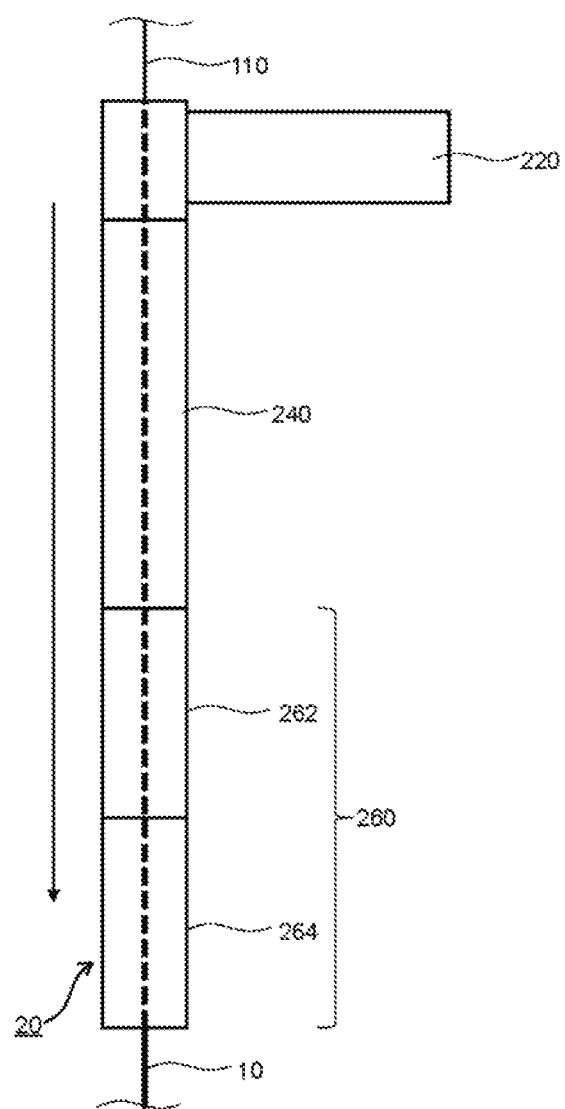
FIG. 3 is a schematic plan view of a device of manufacturing the DC power cable according to an embodiment of the present disclosure.

Next, with reference to FIG. 2 and FIG. 3, a method of manufacturing the DC power cable of this embodiment will be described. FIG. 2 is a flow chart illustrating a method of manufacturing the DC power cable according to this embodiment. Hereinafter, the step is abbreviated as 'S_'. FIG. 3 is a schematic plan view illustrating a device of manufacturing the DC power cable according to this embodiment.

(S100: Preparation Step)

First, a resin composition including a base resin containing polyethylene, and an inorganic filler is prepared, and a conductor 110 is also prepared. The preparation step S100 of this embodiment includes, for example, a compounding agent preparation step S120, a surface-treatment step S140, a mixing step S160, and a conductor preparation step S180.

(S120: Compounding Agent Preparation Step)

As various compounding agents constituting the resin composition, a base resin containing polyethylene, an inorganic filler, and other additives (antioxidant, lubricant, etc.) are prepared.

(S140: Surface-treatment Step)

After the predetermined inorganic filler is prepared, the inorganic filler is surface-treated with the predetermined silane coupling agent.

The method of surface-treating the inorganic filler with the predetermined silane coupling agent may be either a dry method or a wet method. In the dry method, for example, a solution containing the silane coupling agent is added dropwise into a stirrer, or is sprayed using a sprayer, while stirring the inorganic filler in the stirrer such as a Henschel mixer. In the wet method, for example, an inorganic filler is added to a predetermined solvent to form a slurry, and a silane coupling agent is added into the slurry.

In this embodiment, for example, the inorganic filler is surface-treated with the aminosilane coupling agent. Thereby, the aminosilyl group having the amino group derived from the aminosilane coupling agent can be bonded to at least a part of the surface of the inorganic filler.

In this embodiment, for example, the inorganic filler may be surface-treated not only with the aminosilane coupling agent but also with a hydrophobic silane coupling agent. Thereby, not only the aminosilyl group but also the hydrophobic silyl group having the hydrophobic group can be bonded to the surface of the inorganic filler.

Regarding the method for surface-treating the inorganic filler not only with the aminosilane coupling agent but also with a hydrophobic silane coupling agent, for example, the surface-treatment may be performed using the aminosilane coupling agent and the hydrophobic silane coupling agent simultaneously, or the surface-treatment may be performed using them separately at different timings. In the latter case, as for the order of the surface-treatment with the aminosilane coupling agent and the surface-treatment with the hydrophobic silane coupling agent, it does not matter which of the two is performed first.

At this time, in this embodiment, the inorganic filler is surface-treated with the aminosilane coupling agent and the hydrophobic silane coupling agent so that the molar fraction of the aminosilyl groups described above is, for example, 2% or more and 90% or less, and preferably 5% or more and 80% or less. Specifically, the compounded amount of the aminosilane coupling agent and the compounded amount of the hydrophobic silane coupling agent are respectively set based on $R^1$ included in the aminosilane coupling agent and $R^2$ included in the hydrophobic silane coupling agent so that the molar fraction of the aminosilyl groups falls within the above-described range.

Alternatively, in this embodiment, for example, the inorganic filler may also be surface-treated with only the hydrophobic silane coupling agent. Thereby, a hydrophobic silyl group derived from the hydrophobic silane coupling agent and represented by formula (1) can be bonded to at least a part of the surface of the inorganic filler.

After the surface-treatment is performed with a predetermined silane coupling agent, the inorganic filler after the treatment is dried as needed.

After the surface-treatment step S140 is completed, the mean volume diameter of the inorganic filler may be adjusted by performing a predetermined pulverization treatment. At this time, the mean volume diameter of the inorganic filler is, for example, 80 nm or less, preferably 50 nm or less, and more preferably 30 nm or less.

(S160: Mixing Step)

After the surface-treatment step S140 is completed, the base resin containing polyethylene, the inorganic filler, and other additives (an antioxidant, a lubricant, etc.) are mixed (kneaded) by a mixer such as a Banbury mixer or kneader, to form a mixed material. After the mixed material is formed, the mixed material is granulated by an extruder. As a result, a pellet-like resin composition that is to be included in the insulation layer 130 is formed. The steps from the mixing step through the granulation step may be collectively performed using a twin-screw type extruder with high kneading performance.

(S180: Conductor Preparation Step)

Meanwhile, a conductor 110 is prepared which is formed by twisting a plurality of conductor core wires.

(S200: Cable Core Fabrication Step (Insulation Layer Formation Step))

After the preparation step S100 is completed, a cable core fabrication step (an insulation layer formation step) S200 is performed. The cable core fabrication step S200 includes, for example, an extrusion step S220, a cross-linking step S240, and a cooling step S260.

In the cable core fabrication step S200 of this embodiment, for example, a manufacturing apparatus 20 shown in FIG. 3 is used. The manufacturing apparatus 20 includes, for example, an extrusion part 220, a cross-linking part (cross-linking tube, cross-linking pipe) 240, and a cooling part 260.

The extrusion part 220 is configured, for example, to extrude the resin composition on the outer periphery of the conductor 110 to form the insulation layer 130. In this embodiment, the extrusion part 220 is configured to simultaneously extrude the internal semi conductive layer 120, the insulation layer 130, and the external semi conductive layer 140. The extrusion part 220 includes an extrusion part 220a extruding the internal semi conductive layer 120, an extrusion part 220b extruding the insulation layer 130, and an extrusion part 220c extruding the external semi conductive layer 140.

The cross-linking part 240 is provided, for example, on the downstream side of the extrusion part 220, and is configured to heat the extruded material that has passed through the extrusion part 220 and to cross-link at least the insulation layer 130. The cross-linking part 240 has, for example, a pressurized tube (not shown) that can be pressurized with nitrogen gas or the like, and a heating part (not shown) that heats the inside of the pressurized tube with radiation from an infrared heater. The cross-linking part 240 may be configured to heat-transfer through a heat medium such as high-temperature nitrogen gas or silicone oil.

The cooling part 260 is provided, for example, on the downstream side of the cross-linking part 240, and is configured to cool the cross-linked material that has passed through the cross-linking part 240 (material that has been completed cross-linking). As the coolant for the cooling part 260, for example, water is used.

The cooling part 260 of this embodiment includes, for example, a first cooling part 262 and a second cooling part 264. The first cooling part 262 and the second cooling part 264 are arranged in this order on the downstream side of the cross-linking part 240. The second cooling part 264 includes, for example, a chiller (not shown). The cooling capacity (cooling rate) of the second cooling part 264 is higher than the cooling capacity (cooling rate) of the first cooling part 262.

(S220: Extrusion Step)

For example, using the extrusion part 220, the internal semiconductive layer 120, the insulation layer 130, and the external semiconductive layer 140, outwardly from the inside, are simultaneously extruded on the outer periphery of the conductor 110.

A resin composition for the internal semiconductive layer in which ethylene-ethyl acrylate copolymer and electrically conductive carbon black are mixed in advance is charged into the extrusion part 220a forming the internal semiconductive layer 120.

The pellet-like resin composition described above is charged into the extrusion part 220b forming the insulation layer 130.

A resin composition for the external semiconductive layer is charged into the extrusion part 220c forming the external semiconductive layer 140, the composition including materials similar to those of the resin composition for the internal semi conductive layer.

Then, the extruded materials from the extrusion parts 220a to 220c are guided to a common head, and the internal semiconductive layer 120, the insulation layer 130, and the external semiconductive layer 140, outwardly from the inside, are simultaneously extruded on the outer periphery of the conductor 110.

(S240: Cross-linking Step)

Next, for example, using the cross-linking part 240, the extruded material that has passed through the extrusion part 220 is heated to a predetermined cross-linking temperature to cross-link at least the base resin forming the insulation layer 130.

Specifically, the cross-linking temperature is set to, for example, 150 ℃ or more and 300 ℃ or less. Thereby, the base resin forming the insulation layer 130 can be cross-linked.

At this time, not only the insulation layer 130 but also at least one of the internal semiconductive layer 120 and the external semiconductive layer 140 may be cross-linked.

(S260: Cooling Step)

Next, for example, using the cooling part 260, the cross-linked material that has passed through the cross-linking part 240 is cooled.

In this embodiment, for example, the resin composition of the insulation layer 130 is cooled so that the crystallinity of the base resin forming the insulation layer 130 is 45% or less. In addition, for example, the resin composition of the insulation layer 130 is cooled so that a light transmittance at a wavelength of 500 nm of a sheet is 55% or more, as measured under an atmosphere at 90 ℃, when the sheet is fabricated by cutting the insulation layer 130 into 0.5 mm thickness.

Conventionally, in this regard, the resin composition of the insulation layer 130 after cross-linking is gradually cooled (slowly cooled). When the resin composition is gradually cooled, the crystallization of the base resin proceeds and the crystallinity of the base resin is likely to be increased. When the crystallinity of the base resin is increased, the visible light transmissivity of the resin composition may be possibly decreased as described above.

In contrast, in this embodiment, the resin composition of the insulation layer 130 is rapidly cooled so that the above-described crystallinity of the base resin and the desired visible light transmissivity of the resin composition can be obtained.

However, even when the resin composition of the insulation layer 130 is cooled from the cross-linking temperature of the base resin to a temperature equal to room temperature or less at once, it is difficult to increase the cooling rate due to a large temperature difference. Specifically, the temperature of water as a coolant rises, into which the cross-linked material has been charged, and it becomes difficult to decrease the temperature of the cross-linked material. In this case, the result may be similar to that obtained in the case where the resin composition is gradually cooled.

In this embodiment, for example, using a first cooling part 262 and a second cooling part 264, the resin composition of the insulation layer 130 is cooled in two stages. The cooling step S260 includes, for example, a first cooling step and a second cooling step.

In the first cooling step, the first cooling part 262 is used to cool the resin composition from the cross-linking temperature of the base resin to a predetermined first temperature. In this case, the first temperature is set to, for example, the lowest temperature capable of maintaining the state in which the base resin is not crystallized (the state in which the crystal is melted). Thereby, the temperature difference between the first temperature and the second temperature described later can be decreased while suppressing the crystallization of the base resin.

Specifically, the first temperature is set to, for example, a crystal melting temperature of the base resin or more and the crystal melting temperature+20 ℃ or less. By setting the first temperature to the crystal melting temperature of the base resin or more, the state in which the base resin is not crystallized can be maintained. By setting the first temperature to the crystal melting temperature+20 ℃ or less, the temperature difference between the first temperature and the second temperature described later can be decreased.

Next, in the second cooling step, the second cooling part 264 is used to cool the resin composition from the first temperature to the second temperature equal to room temperature or less. At this time, since the first temperature is lower than the cross-linking temperature, the resin composition can be rapidly cooled.

In this embodiment, for example, the cooling rate of the second cooling step is faster than the cooling rate of the first cooling step. Thereby, crystallization of the base resin in the insulation layer 130 can be suppressed, and the base resin can be solidified in a state of containing a lot of amorphous portions. That is, the crystallinity of the base resin can be lowered. As a result, the visible light transmissivity of the insulation layer 130 can be improved.

Specifically, the cooling rate of the second cooling step is set to, for example, 50 ℃/min or more and 300 ℃/min or less. By setting the cooling rate of the second cooling step to 50 °/min or more, a predetermined crystallinity of the base resin can be obtained. On the other hand, by setting the cooling rate of the second cooling step to 300 °/min or less, the chiller of the second cooling part 264 can be suppressed from becoming excessively large.

The second temperature is not limited as long as it is equal to room temperature or less but is, for example, −50 °or more and 27 °or less.

The cable core including the conductor 110, the internal semiconductive layer 120, the insulation layer 130, and the external semiconductive layer 140 is formed by the cable core fabrication step S200 described above.

(S300: Shielding Layer and Sheath Formation Step)

After the cable core is formed, the shielding layer 150 is formed on the outside of the external semiconductive layer 140, for example, by winding a copper tape therearound.

After the shielding layer 150 is formed, vinylchloride is charged into an extruder and extruded from the extruder, to form a sheath 160 on the outer periphery of the shielding layer 150.

As described above, the DC power cable 10 as the solid insulation DC power cable is manufactured.

(S400: Inspection Step)

After the DC power cable 10 is manufactured, a part of the DC power cable 10 in an axial direction (for example, a part of its end) is cut. After cutting the DC power cable 10, in a part of the cut DC power cable 10 in the axial direction, the sheath 160 and the shielding layer 150 are removed to expose the cable core.

After the cable core is exposed, the cable core is cut into a predetermined thickness (thinly and spirally stripped) to fabricate an inspection sheet of the insulation layer 130.

After the inspection sheet of the insulation layer 130 is fabricated, a foreign material in the inspection sheet is inspected while heating the inspection sheet at 90, C or more and the crystal melting temperature or less. At this time, by setting the heating temperature of the inspection sheet to 90 °or more, at least a part of the crystals of the base resin is melted, and the visible light transmittance can be improved. On the other hand, by setting the heating temperature of the inspection sheet to the crystal melting temperature or less, the inspection sheet can be suppressed from entirely melting. Thereby, handling properties of the inspection sheet during the inspection step S400 can be suppressed from being decreased.

At this time, for example, the inspection may be performed visually using an optical microscope. Alternatively, the inspection may be performed by computer image analysis.

(S500: Determination Step)

As a result of inspection step S400, the DC power cable 10 in which no foreign material is detected from the inspection sheet is determined as a non-defective article and shipped. On the other hand, the DC power cable 10 in which a foreign material is detected from the inspection sheet is determined as a defective article and excluded from shipment.

After that, manufacturing step of a DC power cable 10 is terminated.

(4) Effect According to the Embodiment

According to this embodiment, one or more effects described below are achieved.

(a) In the cooling step S260 of this embodiment, since the resin composition forming the insulation layer 130 is rapidly cooled, crystallization of the base resin can be suppressed, and the base resin can be solidified in a state of containing a lot of amorphous portions. In addition, the inorganic filler can be suppressed from acting as a nucleating agent, and crystal nuclei of the base resin can be suppressed from increasing. Thereby, the crystallinity of the base resin can be lowered. Since the crystallinity of the base resin is lowered, synergistic light scattering between the base resin and the inorganic filler can be suppressed. As a result, the visible light transmissivity of the insulation layer 130 can be improved.

(b) In this embodiment, when a sheet is fabricated by cutting the resin composition molded article including the base resin and the inorganic filler into 0.5 mm thickness, the light transmittance at a wavelength of 500 nm of the sheet is 55% or more, and preferably 70% or more, as measured under an atmosphere at 90 éC. Thereby, a foreign material in the insulation layer 130 can be easily inspected.

(c) In this embodiment, the crystallinity of the base resin forming the insulation layer 130 is 45% or less. Thereby, the light scattering in the crystal of the base resin can be suppressed. As a result, the visible light transmissivity of the insulation layer 130 can be improved.

(d) In this embodiment, since the inorganic filler is surface-treated with the aminosilane coupling agent described above, at least a part of the surface of the inorganic filler includes the aminosilyl group having the amino group derived from the aminosilane coupling agent. Since the amino group bonded to the inorganic filler has an electron donating property, the surface of the inorganic filler can be positively charged. Thereby, when the inorganic fillers are adjacent to each other, the electrostatic repulsion between the amino groups on the surfaces of the inorganic fillers can be caused. With the electrostatic repulsion between the inorganic fillers, the dispersibility of the inorganic filler in the resin composition can be improved.

By improving the dispersibility of the inorganic filler in the resin composition, that is, by suppressing aggregation of the inorganic filler, the light scattering in the inorganic filler can be suppressed. In addition, the action of the inorganic filler as the nucleating agent due to aggregation can be suppressed, and the crystal nuclei of the base resin can be suppressed from increasing. Thereby, the light scattering in the crystal of the base resin can be suppressed. As a result, the visible light transmissivity of the insulation layer 130 can be improved.

In addition, by improving the dispersibility of the inorganic filler in the resin composition, the space charge can be suppressed from locally accumulating in the insulation layer 130 and the leakage current can be suppressed from occurring, during electric charging. As a result, the insulating property of the insulating layer 130 can be stably improved.

Since at least a part of the surface of the inorganic filler includes the aminosilyl group, the insulation property of the insulation layer 130 is improved. As a mechanism thereof, for example, the following two mechanisms are conceivable, in addition to the 'electrostatic repulsion between the amino groups_ described above.

Since at least a part of the surface of the inorganic filler includes an aminosilyl group, the crystal structure of the base resin can be changed in the vicinity of the particles of the inorganic filler. For example, since the inorganic filler particles including aminosilyl groups are included in the base resin phase, the crystallinity can be increased in the vicinity of the interface between the inorganic filler and the base resin. That is, free volume voids which can be involved in electrical conduction can be reduced. As a result, it is considered that the insulation property of the insulation layer 130 can be stably improved.

Alternatively, since at least a part of the surface of the inorganic filler includes an aminosilyl group, the conductive carrier (space charge) can be easily captured by the amino group. Accordingly, the space charge can be suppressed from locally accumulating in the insulation layer 130 and the leakage current can be suppressed from occurring, during electric charging. As a result, it is considered that the insulation property of the insulation layer 130 can be stably improved.

(e) Since the inorganic filler is surface-treated not only with the above-described aminosilane coupling agent but also with the hydrophobic silane coupling agent, the surface of the inorganic filler includes not only an aminosilyl group but also a hydrophobic silyl group having a hydrophobic group derived from the hydrophobic silane coupling agent. Since not only the aminosilyl group but also the hydrophobic silyl group is given to the surface of the inorganic filler, the aminosilyl group can be suppressed from being exclusively and excessively bonded to the surface of the inorganic filler. Thereby, formation of the hydrogen bonds with amino groups interposed between particles can be suppressed, and the electrostatic repulsion between amino groups can be sufficiently caused. Furthermore, formation of the conductive path through the particle interface due to the hydrogen bonds can be suppressed. As a result, an effect of improving the insulation property of the insulation layer 130 can be significantly improved, while improving the visible light transmissivity of the insulation layer 130.

(f) The ratio of the aminosilyl groups with respect to all of the silyl groups bonded to the surface of the inorganic filler is 2% or more and 90% or less. By setting the molar fraction of the aminosilyl groups to 2% or more, the effect of improving the insulation property of the insulation layer 130 by giving an aminosilyl group to the inorganic filler can be stably obtained even when a predetermined manufacturing process-derived variation occurs in the molar fraction of the aminosilyl groups. By setting the molar fraction of the aminosilyl groups to 90% or less, formation of the hydrogen bonds with amino groups interposed between particles can be suppressed, and the electrostatic repulsion between amino groups can be sufficiently caused. Furthermore, formation of the conductive path through the particle interface due to the hydrogen bonds can be stably suppressed. Thereby, the effect of improving the insulation property of the insulation layer 130 can be sufficiently obtained.

(g) In this embodiment, the inorganic filler may be surface-treated with only the hydrophobic silane coupling agent described above. Thereby, at least a part of the surface of the inorganic filler includes the hydrophobic silyl group derived from the hydrophobic silane coupling agent and represented by formula (1). As a result, the hydrophobicity on the surface of the inorganic filler can be improved.

Alkoxysilane or halogenated silane is discussed here as an example of the hydrophobic silane coupling agent. When the inorganic filler is surface-treated with alkoxysilane or halogenated silane, a hydroxyl group generated in the silane coupling agent by hydrolysis may not undergo dehydration condensation with the hydroxyl group on the surface of the inorganic filler and remains in the silyl group in some cases. Alternatively, some hydrolyzable groups (alkoxy groups or halogen groups) in alkoxysilane or halogenated silane may not be hydrolyzed but remain in the silyl group. In such a case, the hydrophobicity on the surface of the inorganic filler may not be sufficiently obtained. For this reason, the compatibility of the inorganic filler with the base resin may be reduced. In the case where the hydroxyl group remains, the inorganic filler may be aggregated due to hydrogen bonds.

In addition, alkoxysilane or halogenated silane may have a number of hydrolyzable groups per molecule. In such a case, a plurality of bonds of a single silyl group may possibly be bonded to the inorganic fillers. Accordingly, it becomes difficult to bind a number of silyl groups to the surface of the inorganic filler. Again, for this reason, hydrophobicity on the surface of the inorganic filler may not be sufficiently obtained.

In contrast, in this embodiment, the surface of the inorganic filler may include only the hydrophobic silyl group represented by formula (1). In this case, in the hydrophobic silyl group, three hydrophobic groups are bonded to a silicon atom. In other words, neither a hydroxyl group nor a hydrolyzable group is bonded to the silicon atom of the hydrophobic silyl group (neither a hydroxyl group nor a hydrolyzable group remains in the silicon atom of the hydrophobic silyl group). Thereby, the hydrophobicity on the surface of the inorganic filler can be improved. The improved hydrophobicity on the surface of the inorganic filler can improve the compatibility of the inorganic filler with the base resin. In addition, the absence of a hydroxyl group in the hydrophobic silyl group bonded to the surface of the inorganic filler can suppress aggregation of the inorganic filler due to hydrogen bonds. Improvement in the compatibility of the inorganic filler and suppression of hydrogen bonds can improve the dispersibility of the inorganic filler in the resin composition.

In this embodiment, the hydrophobic silyl group represented by the formula (1) has one bond to be bonded to the inorganic filler. Therefore, many hydrophobic silyl groups can be bonded to the surface of the inorganic filler. In other words, the hydrophobicity on the surface of the inorganic filler can be efficiently improved. Again, for this reason, the dispersibility of the inorganic filler in the resin composition can be improved.

As described above, by improving the dispersibility of the inorganic filler in the resin composition, the insulation property of the insulation layer 130 can be stably improved while improving the visible light transmissivity of the insulation layer 130.

Other Embodiments According to the Disclosure

Although the present disclosure has been specifically described, the present disclosure is not limited to the embodiments described above, and various modifications can be made without departing from the scope of the present disclosure.

The embodiments described above explain a case where the base resin forming the insulation layer 130 is cross-linked. However, the base resin may be non-cross-linked so long as the crystallinity of the base resin can be lowered. In this case, for example, in the cooling step after the extrusion step, the above-described two-stage cooling step may be performed.

EXAMPLE

Next, examples according to the present disclosure will be described. These examples are illustrative of the present disclosure, and the present disclosure is not limited by these examples.

Experiment 1

First, the following experiment 1 was performed as a case where the inorganic filler was magnesium oxide.

(1-1) Fabrication of Sheet Sample of Resin Composition Molded Article

The materials for each of samples A1 to A8 were roll-mixed to form a resin composition. Next, a predetermined cross-linking step and a predetermined cooling step were performed. As a result, sheet samples composed of the resin composition molded articles of samples A1 to A8 were fabricated. The detailed conditions are as follows.

[Sample A1]
(Base Resin)
  Low-density polyethylene (LDPE): Sumicasen C215 manufactured by SUMITOMO CHEMICAL COMPANY, LIMITED (density, d=920 kg/m³; MFR=1.4 g/10 min)
  100 parts by mass
(Inorganic Filler)
  Magnesium oxide: Magnesium oxide manufactured by a vapor phase method (mean volume diameter 10 nm)
  1 part by mass
  Surface-treatment: Dry method
  Silane coupling agent: Hexamethyldisilazane only
(Additives)
  Cross-linking agent: Dicumylperoxide
  1.3 parts by mass
  Antioxidant: 4,4'-Thiobis (3-methyl-6-t-butylphenol) (TBMTBP)
  0.22 parts by mass
(Cross-Linking Step)

After the resin composition was formed, the resin composition was pressed by press molding at 180 éC for 30 minutes, to fabricate sheets of the resin composition having a thickness of 0.5 mm and 0.2 mm, respectively. The base resin was cross-linked by heating at 180 éC for 30 minutes.

(Cooling Step)

After the sheet of the resin composition was cross-linked, the sheet was rapidly cooled by the following two-stage cooling steps.
  First cooling step: Water-cooled; First temperature, 120 éC; Cooling rate, 30 éC/min;
  Second cooling step: Water-cooled; Second temperature, 0 éC; Cooling rate, 120 éC/min.

In the following samples A2 to A4, the conditions other than the silane coupling agent used for the surface-treatment of the inorganic filler were equivalent to those in sample A1. The silane coupling agent used for the surface-treatment of the inorganic filler was as follows.

[Sample A2]
  Silane coupling agent:
  3-Aminopropyltrimethoxysilane as an aminosilane coupling agent
  Hexamethyldisilazane as a hydrophobic silane coupling agent
  The compounded amounts of the aminosilane coupling agent and the hydrophobic silane coupling agent were set so that the molar fraction of the aminosilyl groups was 12%.

[Sample A3]
  Silane coupling agent:
  3-Aminopropyltrimethoxysilane

[Sample A4]
  Silane coupling agent:
  3-Methacryloxypropyltrimethoxysilane

In the following samples A5 to A8, the conditions other than those in cooling steps were equivalent to those in samples A1 to A4.

[Samples A5 to A8]
(Cooling Step)

After the sheet of the resin composition was cross-linked, the sheet was gradually cooled under the following cooling condition:
  Water-cooled; Cooling rate, 5 éC/min.

(1-2) Evaluation
(Crystallinity)

As a DSC device, DSC 8500 (a power compensation type) manufactured by PerkinElmer Inc. was used. The reference sample was, for example, -alumina. First, the reference sample and each sample were heated from 30 ɔ to 150 ɔ at a rate of 10 ɔ /min. After the DSC curve was obtained, the area of the region enclosed between the endothermic peak and the base line was determined to obtain melting heat (in J/g) of the base resin. Based on the thus-obtained melting heat of the base resin and the melting heat of the perfect crystal, the crystallinity (in %) of the base resin was obtained by the above-described equation (2).

(Transmittance)

Using a spectrophotometer V-750 manufactured by JASCO Corporation, the light transmittance at a wavelength of 500 nm of the sheet (0.5 mm thick) of each sample was measured under an atmosphere at 90 ɔ.

(Volume Resistivity)

A sheet of each of the above-described samples (0.2 mm thick) was immersed in a silicone oil at the temperature of 80 éC and a DC field of 50 kV/mm was applied to the sheet using a plate electrode having a diameter of 25 mm to measure the volume resistivity. In Experiment 2 described later, the evaluation similar to that in Experiment 1 was performed.

(Molar Fraction of Aminosilyl Group)

Regarding samples A2 and A6, the N/C ratio was measured, and the molar fraction of the aminosilyl groups was obtained based on the measured N/C ratio.

Specifically, the elemental analysis of the surface of the inorganic filler was performed by gas chromatography using TCD under the condition at the reaction temperature of 850 éC and the reduction temperature of 600 éC. Thereby, the N/C ratio in the silyl groups that were actually bonded to the surface of the inorganic filler was determined. The detailed conditions of the device and the like are as follows.

Instrument: Oxygen circulating combustion/TCD detection type NCH quantitative analyzing instrument SUMIGRAPH NCH-22F (Sumika Chemical Analysis Service, Ltd.)

Measurement condition:
  Reaction temperature: 850 éC
  Reduction temperature: 600 éC
  Separation/detection:
    Porous polymer beads-packed column/TCD
  Standard sample:
    Standard sample for elemental determination, acetanilide On the other hand, based on the aminosilane coupling agent and the hydrophobic silane coupling agent used in Experiment 1, the N/C ratio, y, is expressed by the following equation (8)' as a function of the molar fraction of the aminosilyl group, x.

$$Y = 0.0039 \times XXX \tag{8'}$$

(wherein $0 < x \leq 100$).

The actually measured N/C ratio, y, was substituted in equation (8)', which is the calibration curve, to determine the molar fraction of the aminosilyl groups, x, in the silyl groups that were actually bonded to the surface of the inorganic filler.

(1-3) Results

With reference to the following Table 1 and Table 2, the evaluation result of each sample in Experiment 1 will be described. In the following tables, the content of the compounded agent is expressed in 'parts by mass_ (the same applies in Experiment 2). In addition, the parenthesized item subsequent to the term 'magnesium oxide_ indicates a silane coupling agent used for the surface-treatment of the inorganic filler.

TABLE 1

| | Sample A1 | Sample A2 | Sample A3 | Sample A4 |
|---|---|---|---|---|
| LDPE | 100 | 100 | 100 | 100 |
| Magnesium oxide (hexamethyldisilazane) | 1 | | | |
| Magnesium oxide (3-aminopropyltrimethoxysilane + hexamethyldisilazane) | | 1 | | |
| Magnesium oxide (3-aminopropyltrimethoxysilane) | | | 1 | |
| Magnesium oxide (3-methacryloxypropyltrimethoxysilane) | | | | 1 |
| Cooling step | Rapidly cooling | Rapidly cooling | Rapidly cooling | Rapidly cooling |
| Crystallinity | 37 | 38 | 36 | 44 |
| Transmittance at wavelength of 500 nm (@90° C.) (%) | 71 | 74 | 73 | 56 |
| Volume resistivity (@80° C.) (Ω · cm) | $3.1 \times 10^{16}$ | $6.6 \times 10^{18}$ | $3.9 \times 10^{16}$ | $1.3 \times 10^{15}$ |

TABLE 2

| | Sample A5 | Sample A6 | Sample A7 | Sample A8 |
|---|---|---|---|---|
| LDPE | 100 | 100 | 100 | 100 |
| Magnesium oxide (hexamethyldisilazane) | 1 | | | |
| Magnesium oxide (3-aminopropyltrimethoxysilane + hexamethyldisilazane) | | 1 | | |
| Magnesium oxide (3-aminopropyltrimethoxysilane) | | | 1 | |
| Magnesium oxide (3-methacryloxypropyltrimethoxysilane) | | | | 1 |
| Cooling step | Gradually cooling | Gradually cooling | Gradually cooling | Gradually cooling |
| Crystallinity | 54 | 52 | 55 | 54 |
| Transmittance at wavelength of 500 nm (@90° C.) (%) | 45 | 43 | 47 | 46 |
| Volume resistivity (@80° C.) (Ω · cm) | $3.3 \times 10^{16}$ | $6.5 \times 10^{18}$ | $3.6 \times 10^{16}$ | $1.6 \times 10^{15}$ |

Regarding the inorganic fillers in samples A2 and A6, the N/C ratio was measured, and the molar fraction of the aminosilyl groups was calculated by submitting the measured N/C ratio into equation (8)'. As a result, it was confirmed that the molar fraction of the aminosilyl groups assumed at the time of the surface-treatment was obtained.

(Dependence on Cooling Condition)

As shown in Table 2, in samples A5 to A8 that were gradually cooled, the crystallinity of the base resin was more than 50%, and the transmittance at a wavelength of 500 nm was less than 55%.

In contrast, as shown in Table 1, the crystallinities of the base resins in samples A1 to A4 that were rapidly cooled were lower than those of samples A5 to A8 that were gradually cooled and were 45% or less. Thereby, the transmittances of the samples A1 to A4 at a wavelength of 500 nm were higher than those of samples A5 to A8 and were 55% or more.

According to these results, by performing rapid cooling after the cross-linking step, crystallization of the base resin can be suppressed, and the base resin can be solidified in a state of containing a lot of amorphous portions. In addition, the inorganic filler can be suppressed from acting as a nucleating agent, and crystal nuclei of the base resin can be suppressed from increasing. Thereby, the crystallinity of the base resin can be lowered. As a result, it was confirmed that the visible light transmissivity of the sheet can be improved.

When the volume resistivity of each of samples A5 to A8 that were gradually cooled was compared to the volume resistivity of each of samples A1 to A4 that were rapidly cooled, respectively, the volume resistivities of the samples under the same surface-treatment condition of the inorganic filler were equivalent to each other, regardless of the cooling conditions. From this result, it was confirmed that the cooling condition has no effect on the volume resistivity.

(Dependence on Surface-Treatment)

As shown in Table 1, the crystallinities of the base resins in sample A1 using hexamethyldisilazane, sample A2 using 3-aminopropyltrimethoxysilane and hexamethyldisilazane, and sample A3 using 3-aminopropyltrimethoxysilane were lower than that in sample A4 using 3-methacryloxypropyltrimethoxysilane. Therefore, the transmittances of the samples A1 to A3 at a wavelength of 500 nm were higher than that of sample A4.

In addition, the volume resistivities of samples A1 to A3 were higher than that of sample A4. The volume resistivity showed a tendency to be convex upward with respect to the molar fraction of the aminosilyl groups. In particular, the volume resistivity of sample A2 having the molar fraction of the aminosilyl group of 12% was significantly higher.

According to these results, since the inorganic filler was surface-treated with at least one of hexamethyldisilazane and 3-aminopropyltrimethoxysilane, at least one of trimethylsilyl group and aminopropylsilyl group can be given to the surface of inorganic filler. Since at least a part of the surface of the inorganic filler includes at least one of the hydrophobic silyl group represented by formula (1) and the aminosilyl group, the dispersibility of the inorganic filler in the resin composition can be improved.

By improving the dispersibility of the inorganic filler in the resin composition, the light scattering in the inorganic filler can be suppressed. In addition, the action of the inorganic filler as the nucleating agent due to aggregation can be suppressed, and the crystal nuclei of the base resin can be suppressed from increasing. Thereby, the light scattering in the crystal of the base resin can be suppressed. As a result, it was confirmed that the visible light transmissivity of the sheet can be improved.

In addition, by improving the dispersibility of the inorganic filler in the resin composition, the space charge can be suppressed from locally accumulating in the resin composition and the leakage current can be suppressed from occurring, during electric charging. As a result, it was confirmed that the insulation property of the sheet can be stably improved.

In addition, it was confirmed that the volume resistivity can be significantly improved and can be $5 \times 10^{16}$ Ω·m or more, by setting the molar fraction of the aminosilyl group to 2% or more and 90% or less.

Experiment 2

Next, in order to evaluate the dependence on the type of the inorganic filler, the following Experiment 2 was performed.
(2-1) Fabrication of Sheet Sample of Resin Composition In samples B1 to B8, the conditions other than the point that the following silicon dioxide was used as the inorganic filler were equivalent to those in samples A1 to A8.
[Samples B1 to B8]
(Inorganic Filler)

Silicon dioxide: Fumed silica (mean volume diameter, 12 nm)
1 part by mass
(2-2) Evaluation In Experiment 2, the same evaluation as in Experiment 1 was performed.
(2-3) Results With reference to the following Table 3 and Table 4, the evaluation result of each sample in Experiment 2 will be described. In Table 3 and Table 4, the parenthesized item subsequent to the inorganic filler indicates a silane coupling agent used for the surface-treatment of the inorganic filler.

TABLE 3

|  | Sample B1 | Sample B2 | Sample B3 | Sample B4 |
|---|---|---|---|---|
| LDPE | 100 | 100 | 100 | 100 |
| Silicon dioxide (hexamethyl-disilazane) | 1 | | | |
| Silicon dioxide (3-aminopropyltri-methoxysilane + hexamethyldisilazane) | | 1 | | |
| Silicon dioxide (3-aminopropyltri-methoxysilane) | | | 1 | |
| Silicon dioxide (3-methacryloxypropyl-trimethoxysilane) | | | | 1 |
| Cooling step | Rapidly cooling | Rapidly cooling | Rapidly cooling | Rapidly cooling |
| Crystallinity | 35 | 34 | 36 | 44 |
| Transmittance at wavelength of 500 nm (@90° C.) (%) | 75 | 73 | 76 | 58 |
| Volume resistivity (@80° C.) (Ω·cm) | $3.1 \times 10^{16}$ | $6.6 \times 10^{18}$ | $3.9 \times 10^{16}$ | $1.3 \times 10^{15}$ |

TABLE 4

|  | Sample B5 | Sample B6 | Sample B7 | Sample B8 |
|---|---|---|---|---|
| LDPE | 100 | 100 | 100 | 100 |
| Silicon dioxide (hexamethyl-disilazane) | 1 | | | |
| Silicon dioxide (3-aminopropyltri-methoxysilane + hexamethyldisilazane) | | 1 | | |
| Silicon dioxide (3-aminopropyltri-methoxysilane) | | | 1 | |
| Silicon dioxide (3-methacryloxypropyl-trimethoxysilane) | | | | 1 |
| Cooling step | Gradually cooling | Gradually cooling | Gradually cooling | Gradually cooling |
| Crystallinity | 52 | 53 | 56 | 55 |
| Transmittance at wavelength of 500 nm (@90° C.) (%) | 47 | 44 | 46 | 45 |
| Volume resistivity (@80° C.) (Ω·cm) | $3.5 \times 10^{16}$ | $6.1 \times 10^{18}$ | $4.1 \times 10^{16}$ | $1.9 \times 10^{15}$ |

Regarding the inorganic fillers in samples B2 and B6, the N/C ratio was measured, and the molar fraction of the aminosilyl groups was calculated by submitting the measured N/C ratio into equation (8)'. As a result, it was confirmed that the molar fraction of the aminosilyl groups assumed at the time of the surface-treatment was obtained.
(Dependence on Cooling Condition)

As shown in Table 3, also in the case where the inorganic filler is silicon dioxide, the crystallinities of the base resins in samples B1 to B4 that were rapidly cooled were lower than those of samples B5 to B8 that were gradually cooled and were 45% or less. Thereby, the transmittances of the samples B1 to B4 at a wavelength of 500 nm were higher than those of samples B5 to B8 and were 55% or more.

According to these results, as with the case where the inorganic filler was magnesium oxide, the effect of lowering the crystallinity of the base resin was obtained by rapid cooling also in the case where the inorganic filler was silicon dioxide. As a result, it was confirmed that the visible light transmissivity of the sheet can be improved, regardless of the type of the inorganic filler.

In addition, also in the case where the inorganic filler was silicon dioxide, the volume resistivities of samples under the same surface-treatment condition of the inorganic filler were equivalent to each other, regardless of the cooling conditions. From this result, it was confirmed that the cooling condition has no effect on the volume resistivity, regardless of the type of the inorganic filler.
(Dependence on Surface-Treatment)

As shown in Table 3, also in the case where the inorganic filler is silicon dioxide, the crystallinities of the base resins in samples B1 to B3 were lower than that of sample B4. Therefore, the transmittances of the samples B1 to B3 at a wavelength of 500 nm were higher than that of sample B4.

In addition, also in the case where the inorganic filler was silicone dioxide, the volume resistivities of samples B1 to B3 were higher than that of sample B4. Again, in the case where the inorganic filler was silicon dioxide, the volume resistivity showed a tendency to be convex upward with respect to the molar fraction of the aminosilyl groups. In particular, the volume resistivity of sample B2 having the molar fraction of the aminosilyl group of 12% was significantly higher.

According to these results, also in the case where the inorganic filler is silicon dioxide, since at least a part of the surface of the inorganic filler includes at least one of the hydrophobic silyl group represented by formula (1) and the aminosilyl group, the dispersibility of the inorganic filler in the resin composition can be improved. As a result, it was confirmed that the insulation property of the sheet can be improved, while improving the visible light transmissivity, regardless of the type of the inorganic filler.

In addition, it was confirmed that the volume resistivity can be significantly improved and can be $5 \times 10^{16}$ Ωcm or more, regardless of the type of the inorganic filler, by setting the molar fraction of the aminosilyl groups to 2% or more and 90% or less.

<Preferred Aspect of the Present Disclosure>

Hereinafter, supplementary descriptions of the preferred aspects of the present disclosure will be given.

(Supplementary Description 1)

A resin composition molded article forming an insulation layer of a direct-current power cable, including:

a cross-linked base resin containing polyethylene, and an inorganic filler having a mean volume diameter of 80 nm or less;

wherein at least a part of a surface of the inorganic filler includes an aminosilyl group having an amino group, and a light transmittance at a wavelength of 500 nm of a sheet is 70% or more, as measured under an atmosphere at 90 °C, when the sheet is fabricated by cutting the resin composition molded article into 0.5 mm thickness.

(Supplementary Description 2)

The resin composition molded article according to supplementary description 1, wherein the surface of the inorganic filler includes:

the aminosilyl group, and a hydrophobic silyl group having a hydrophobic group.

(Supplementary Description 3)

The resin composition molded article according to supplementary description 2, wherein a molar fraction of the aminosilyl groups with respect to all of the silyl groups bonded to the surface of the inorganic filler is 2% or more and 90% or less.

(Supplementary Description 4)

The resin composition molded article according to supplementary description 2, wherein a mass ratio of nitrogen to carbon is 0.7% or more and 35% or less, as obtained by elemental analysis of the surface of the inorganic filler by gas chromatography using a thermal conductivity detector under the condition at a reaction temperature of 850 °C and a reduction temperature of 600 °C.

(Supplementary Description 5)

The resin composition molded article according to any one of supplementary descriptions 1 to 4, wherein the content of the inorganic filler is 0.1 parts by mass or more and 10 parts by mass or less with respect to 100 parts by mass of the base resin.

(Supplementary Description 6)

A resin composition molded article forming an insulation layer of a direct-current power cable, including:

a cross-linked base resin containing polyethylene, and an inorganic filler having a mean volume diameter of 80 nm or less;

wherein at least a part of a surface of the inorganic filler includes a hydrophobic silyl group represented by the following formula (1), and a light transmittance at a wavelength of 500 nm of a sheet is 70% or more, as measured under an atmosphere at 90 °C, when the sheet is fabricated by cutting the resin composition molded article into 0.5 mm thickness:

[Chem. 8]

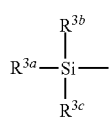

wherein $R^{3a}$, $R^{3b}$, and $R^{3c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{3a}$, $R^{3b}$, and $R^{3c}$ may be the same, or two or more of them may be different.

(Supplementary Description 7)

The resin composition molded article according to supplementary description 6, wherein the content of the inorganic filler is 0.1 parts by mass or more and 5 parts by mass or less with respect to 100 parts by mass of the base resin.

(Supplementary Description 8)

The resin composition molded article according to any one of supplementary descriptions 1 to 7, wherein a crystallinity of the base resin is 45% or less.

(Supplementary Description 9)

The resin composition molded article according to supplementary description 8, wherein the crystallinity of the base resin is 40% or less.

(Supplementary Description 10)

The resin composition molded article according to any one of supplementary descriptions 1 to 9, wherein a volume resistivity of a sheet of the resin composition is $8 \times 10^{15}$ Ωcm or more, as measured under the condition at the temperature of 80 °C and the direct-current field of 50 kV/mm, when the sheet is fabricated by cutting the resin composition molded article into 0.2 mm thickness.

(Supplementary Description 11)

A direct-current power cable including:

a conductor, and an insulation layer provided on an outer periphery of the conductor;

wherein the insulation layer is composed of a resin composition molded article including a base resin containing polyethylene, and an inorganic filler having a mean volume diameter of 80 nm or less, the base resin being cross-linked;

at least a part of a surface of the inorganic filler includes an aminosilyl group having an amino group, and a light transmittance at a wavelength of 500 nm of a sheet is 70% or more, as measured under an atmosphere at 90 °C, when the sheet is fabricated by cutting the insulation layer into 0.5 mm thickness.

(Supplementary Description 12)

A direct-current power cable including:

a conductor, and an insulation layer provided on an outer periphery of the conductor;

wherein the insulation layer is composed of a resin composition molded article including a base resin containing polyethylene, and an inorganic filler having a mean volume diameter of 80 nm or less, the base resin being cross-linked;

at least a part of a surface of the inorganic filler includes a hydrophobic silyl group represented by the following formula (1), and a light transmittance at a wavelength of 500 nm of a sheet is 70% or more, as measured under an atmosphere at 90 °C, when the sheet is fabricated by cutting the insulation layer into 0.5 mm thickness:

[Chem. 9]

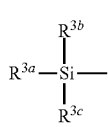

(1)

wherein $R^{3a}$, $R^{3b}$, and $R^{3c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{3a}$, $R^{3b}$, and $R^{3c}$ may be the same, or two or more of them may be different.

(Supplementary Description 13)

A method of manufacturing a direct-current power cable, including:

preparing a resin composition including a base resin containing polyethylene, and an inorganic filler having a mean volume diameter of 80 nm or less; and forming an insulation layer on the outer periphery of the conductor with the resin composition;

wherein, in the preparation of the resin composition, an aminosilyl group having an amino group is bonded to at least a part of a surface of the inorganic filler, and the formation of the insulation layer includes:

extruding the resin composition on the outer periphery of the conductor, heating the resin composition to a predetermined cross-linking temperature to cross-link the base resin, and cooling the resin composition from the cross-linking temperature to a predetermined temperature;

wherein, in the cooling of the resin composition, the resin composition is cooled so that a light transmittance at a wavelength of 500 nm of a sheet is 70% or more, as measured under an atmosphere at 90 éC, when the sheet is fabricated by cutting the insulation layer into 0.5 mm thickness:

(Supplementary Description 14)

A method of manufacturing a direct-current power cable, including:

preparing a resin composition including a base resin containing polyethylene, and an inorganic filler having a mean volume diameter of 80 nm or less; and forming an insulation layer on the outer periphery of the conductor with the resin composition;

wherein, in the preparation of the resin composition, a hydrophobic silyl group represented by the following formula (1) is bonded to at least a part of a surface of the inorganic filler;

the formation of the insulation layer includes:

extruding the resin composition on the outer periphery of the conductor, heating the resin composition to a predetermined cross-linking temperature to cross-link the base resin, and cooling the resin composition from the cross-linking temperature to a predetermined temperature;

wherein, in the cooling of the resin composition, the resin composition is cooled so that a light transmittance at a wavelength of 500 nm of a sheet is 70% or more, as measured under an atmosphere at 90 éC, when the sheet is fabricated by cutting the insulation layer into 0.5 mm thickness:

[Chem. 10]

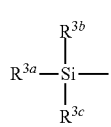

(1)

wherein $R^{3a}$, $R^{3b}$, and $R^{3c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group, provided that $R^{3a}$, $R^{3b}$, and $R^{3c}$ may be the same, or two or more of them may be different.

(Supplementary Description 15)

The method of manufacturing a direct-current power cable according to supplementary description 13 or 14, wherein the cooling of the resin composition includes:

a first cooling to cool the resin composition from the cross-linking temperature to a first temperature set to a crystal melting temperature or more and the crystal melting temperature+20 éC or less; and a second cooling to cool the resin composition from the first temperature to a second temperature set to room temperature or less;

wherein a cooling rate in the second cooling is faster than a cooling rate in the first cooling.

(Supplementary Description 16)

The method of manufacturing a direct-current power cable according to any one of supplementary descriptions 13 to 15, including:

inspecting a foreign material in an inspection sheet while heating the inspection sheet at 90 éC or more and the crystal melting temperature or less, the inspection sheet being fabricated by cutting a portion of the insulation layer in an axial direction of the direct-current power cable with a predetermined thickness after the cooling of the resin composition.

DESCRIPTION OF SIGNS AND NUMERALS

10 Direct-current power cable
110 Conductor
120 Internal semiconductive layer
130 Insulation layer
140 External semiconductive layer
150 Shielding layer
160 Sheath

What is claimed is:

1. A resin composition molded article, comprising:
   a cross-linked base resin containing polyethylene, and
   an inorganic filler having a mean volume diameter of 80 nm or less;
   wherein at least a part of a surface of the inorganic filler comprises an aminosilyl group having an amino group, and
   a light transmittance at a wavelength of 500 nm of a sheet is 70% or more, as measured under an atmosphere at 90° C., when the sheet is fabricated by cutting the resin composition molded article into 0.5 mm thickness.

2. The resin composition molded article according to claim 1,
   wherein the surface of the inorganic filler comprises:
   the aminosilyl group, and
   a hydrophobic silyl group having a hydrophobic group.

3. The resin composition molded article according to claim 2, wherein a molar fraction of the aminosilyl groups with respect to all of the silyl groups bonded to the surface of the inorganic filler is 2% or more and 90% or less.

4. The resin composition molded article according to claim 2, wherein the crystallinity of the base resin is 40% or less.

5. The resin composition molded article according to claim 2, wherein a volume resistivity of a sheet of the resin composition is $8 \times 10^{15}$ Ω·cm or more, as measured under the condition at the temperature of 80° C. and the direct-current field of 50 kV/mm, when the sheet is fabricated by cutting the resin composition molded article into 0.2 mm thickness.

6. A direct-current power cable comprising:
a conductor, and
an insulation layer provided on an outer periphery of the conductor;
wherein the insulation layer is composed of a resin composition molded article according to claim 2.

7. The resin composition molded article according to claim 2, wherein the hydrophobic silyl group having a hydrophobic group is represented by the following formula (7):

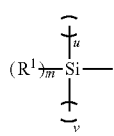

(7)

wherein $R^2$ represents at least any one of a $C_1$ to $C_{20}$ alkyl group optionally substituted with halogen, a $C_1$ to $C_{20}$ alkoxy group optionally substituted with halogen, a $C_2$ to $C_{20}$ alkenyl group optionally substituted with halogen, or a $C_6$ to $C_{12}$ aryl group optionally substituted with halogen or optionally substituted with a $C_1$ to $C_3$ alkyl group optionally substituted with halogen; m represents an integer from 1 to 3; when m is 2 or more, a plurality of $R^2$s may be the same or different; u and v for bonds represent 0 or 1, the sum of m, u and v being 3.

8. The resin composition molded article according to claim 1, wherein the content of the inorganic filler is 0.1 parts by mass or more and 10 parts by mass or less with respect to 100 parts by mass of the base resin.

9. The resin composition molded article according to claim 1, wherein the crystallinity of the base resin is 40% or less.

10. The resin composition molded article according to claim 1, wherein a volume resistivity of a sheet of the resin composition is $8 \times 10^{15}$ Ω·cm or more, as measured under the condition at the temperature of 80° C. and the direct-current field of 50 kV/mm, when the sheet is fabricated by cutting the resin composition molded article into 0.2 mm thickness.

11. A direct-current power cable comprising:
a conductor, and
an insulation layer provided on an outer periphery of the conductor;
wherein the insulation layer is composed of the resin composition molded article according to claim 1.

12. A resin composition molded article, comprising:
a cross-linked base resin containing polyethylene, and
an inorganic filler having a mean volume diameter of 80 nm or less;
wherein at least a part of a surface of the inorganic filler comprises a hydrophobic silyl group represented by the following formula (1), and
a light transmittance at a wavelength of 500 nm of a sheet is 70% or more, as measured under an atmosphere at 90° C., when the sheet is fabricated by cutting the resin composition molded article into 0.5 mm thickness:

wherein $R^{3a}$, $R^{3b}$, and $R^{3c}$ represent any one of a $C_1$ to $C_{20}$ alkyl group, a $C_2$ to $C_{20}$ alkenyl group, or a $C_6$ to $C_{12}$ aryl group optionally substituted with a $C_1$ to $C_3$ alkyl group,
provided that $R^{3a}$, $R^{3b}$, and $R^{3c}$ may be the same, or two or more of them may be different.

13. The resin composition molded article according to claim 12, wherein the content of the inorganic filler is 0.1 parts by mass or more and 5 parts by mass or less with respect to 100 parts by mass of the base resin.

14. A direct-current power cable comprising:
a conductor, and
an insulation layer provided on an outer periphery of the conductor;
wherein the insulation layer is composed of a resin composition molded article according to claim 12.

15. The resin composition molded article according to claim 12, wherein the crystallinity of the base resin is 40% or less.

16. The resin composition molded article according to claim 12, wherein a volume resistivity of a sheet of the resin composition is $8 \times 10^{15}$ Ω·cm or more, as measured under the condition at the temperature of 80° C. and the direct-current field of 50 kV/mm, when the sheet is fabricated by cutting the resin composition molded article into 0.2 mm thickness.

* * * * *